(12) United States Patent
Teichrob et al.

(10) Patent No.: US 12,459,016 B2
(45) Date of Patent: Nov. 4, 2025

(54) ORGANIC MATERIAL HANDLING SYSTEM CONTROLLER

(71) Applicant: TY-CROP MANUFACTURING LTD., Rosedale (CA)

(72) Inventors: Gary Wayne Teichrob, Rosedale (CA); Kevin Brent Thiessen, Rosedale (CA); James Ryan Brezden, Lindell Beach (CA); Eric Milton Clegg, Chilliwack (CA); Ian Breeweg, Fort Macleod (CA); Dennis Keith Ho, Abbotsford (CA)

(73) Assignee: TY-CROP MANUFACTURING LTD., Rosedale (CA)

( * ) Notice: Subject to any disclaimer, the term of this patent is extended or adjusted under 35 U.S.C. 154(b) by 889 days.

(21) Appl. No.: 17/710,496

(22) Filed: Mar. 31, 2022

(65) Prior Publication Data
US 2023/0311177 A1 Oct. 5, 2023

(51) Int. Cl.
*B09B 3/30* (2022.01)
*B65F 3/02* (2006.01)

(52) U.S. Cl.
CPC ............... *B09B 3/30* (2022.01); *B65F 3/02* (2013.01); *B65F 2003/0216* (2013.01); *B65F 2003/022* (2013.01)

(58) Field of Classification Search
CPC ...... B09B 3/30; B65F 3/02; B65F 2003/0216; B65F 2003/022; B65G 47/44;
(Continued)

(56) References Cited

U.S. PATENT DOCUMENTS

| 1,710,969 A | 4/1929 | Dempsey |
| 1,791,381 A | 2/1931 | Rogers |

(Continued)

FOREIGN PATENT DOCUMENTS

| CA | 2435744 C | * 4/2008 | ............ B61D 15/00 |
| CN | 203616669 U | * 5/2014 | |

(Continued)

OTHER PUBLICATIONS

CN113807601 En translation with paragraph numbers (Year: 2021).*
(Continued)

*Primary Examiner* — Jacob S. Scott
*Assistant Examiner* — Erin Morris
(74) *Attorney, Agent, or Firm* — ArentFox Schiff LLP; Joseph M. Maraia; Marlo S. Grolnic

(57) ABSTRACT

A control system is provided for control of an organic material handling system. A modular system and method for improving the receiving, processing, storing, and transloading of bulk materials such as organic waste. A system includes at least a receiving module to receive material, a storage module, a discharge module, and a control system. Systems can be adapted with additional modules, such as processing modules and transfer modules, depending on the site and materials to be handled. The storage module has a levelling component for levelling out the organic material stored therein, and a removal component for discharging the organic material. The control system interfaces with the modular components and local operators, and provides remote reporting and monitoring.

19 Claims, 19 Drawing Sheets

(58) Field of Classification Search
CPC .... B65G 47/18; B65G 67/24; B65G 2201/04; B65G 65/30; Y02W 30/40
See application file for complete search history.

(56) References Cited

U.S. PATENT DOCUMENTS

| | | | |
|---|---|---|---|
| 3,109,560 | A | 11/1963 | Rosenleaf |
| 3,147,852 | A | 9/1964 | Hanson |
| 4,096,793 | A | 6/1978 | Wachter et al. |
| 4,401,206 | A | 8/1983 | Ikeda |
| 4,838,750 | A | 6/1989 | Finch |
| 5,477,957 | A | 12/1995 | Bold |
| 5,632,863 | A | 5/1997 | Meador |
| 7,182,202 | B2 | 2/2007 | Kalverkamp |
| 7,244,089 | B2 | 7/2007 | Sperling |
| 7,422,894 | B2 | 9/2008 | Tratt et al. |
| 8,684,161 | B2 | 4/2014 | Gausman et al. |
| 10,315,850 | B2 | 6/2019 | Campbell et al. |
| 10,414,319 | B2 | 9/2019 | Friesen |
| 10,569,976 | B2 | 2/2020 | Lewis et al. |
| 10,717,601 | B2 | 7/2020 | Kornelsen et al. |
| 11,697,550 | B2 | 7/2023 | Dacar et al. |
| 2010/0274452 | A1 * | 10/2010 | Ringwald ............ A01B 69/008 701/50 |
| 2019/0100379 | A1 | 4/2019 | Hatayan |
| 2023/0175370 | A1 | 6/2023 | Gomez Conzatti y Martinez et al. |
| 2023/0312268 | A1 | 10/2023 | Teichrob et al. |
| 2023/0312273 | A1 | 10/2023 | Teichrob et al. |

FOREIGN PATENT DOCUMENTS

| | | | | |
|---|---|---|---|---|
| CN | 108190549 | A * | 6/2018 | ........... B65G 65/005 |
| CN | 208110337 | U * | 11/2018 | ......... G05B 19/0423 |
| CN | 111099928 | A * | 5/2020 | |
| CN | 109400355 | B * | 7/2021 | ............... C05B 7/00 |
| CN | 214298335 | U * | 9/2021 | |
| CN | 113807601 | A * | 12/2021 | |
| EP | 2220925 | A1 * | 8/2010 | ........... A01D 41/127 |
| EP | 2821761 | A1 | 1/2015 | |
| FI | 116247 | B * | 3/2004 | |

OTHER PUBLICATIONS

FI 116247 with EN translation (Year: 2004).*
U.S. Non-Final Rejection issued in U.S. Appl. No. 17/710,540 on Dec. 16, 2024, 17 pages.

* cited by examiner

ORGANIC MATERIAL HANDLING SYSTEM CONTROLLER

CROSS-REFERENCE TO RELATED APPLICATIONS

This is the first application filed for the present invention.

FIELD OF THE INVENTION

The present invention pertains to the field of bulk material handling and processing, and in particular to a managed system for bulk material receiving, processing, storage and loading, and associated computerized control systems.

BACKGROUND

Organic waste streams make up a significant percentage of the garbage sent to landfills, generating greenhouse gas emissions and reducing the lifespan of the landfills. One such waste stream is municipal organic waste, for example generated by households and collected by a municipality. Diverting municipal organics from the waste stream and converting them to compost fertilizer or soil is an environmentally sustainable way to manage these organics. This diversion and the subsequent production of Class A compost reduces waste-stream volume and impact by recycling the materials for beneficial use. Composts made from municipal organics are safe, socially responsible, and environmentally sound, and are used around the world to reclaim disturbed areas, develop land, and improve nutrient-deficient soil.

With municipalities increasingly making climate commitments and implementing policies and programs to achieve zero-waste outcomes, customized and turnkey residuals management solutions to residuals producers and users are needed. Using a system that efficiently manages organic waste, companies can help customers meet their waste-reduction and circular-economy goals and commitments, handling multiple residuals streams to produce beneficial end-use products for reclamation, horticulture, and agriculture. The system becomes part of a service solution for the provision of site management, loading, transportation, and processing organic materials received in various locations.

Current systems to capture this organic waste typically consist of the waste being collected by curbside trucks, brought to a site, and dumped on the ground and pushed into a storage pile or bunker. Next, a front-end loader or similar is used to load the waste into a trailer. The waste is then dumped at a composting facility, where it is again handled by equipment into a processor to shred or otherwise prepare the material for composting. It is finally handled once more by equipment to place it into windrows where the active composting takes place.

These existing systems have several potential disadvantages, listed as follows. The site footprint where the waste is received is large. The site often requires earthworks to be constructed, such as earthen berms and/or ramps to contain materials and elevate trucks when dumping. The waste is exposed, being dumped on the ground in piles, and this becomes a vector attractant for insects, rodents, etc. Exposed organic wasted often has a putrid smell which cannot be contained. Leachate concerns may exist, for example in where unknown liquids can escape into the environment. The sites, being large, noisy, and having an unpleasant smell, are usually situated far from the residential areas where the waste is collected. Fluctuating organics volumes can make it difficult to schedule trucks for pickup and may require continued monitoring of the site by an individual. Greenhouse gases (GHGs) are produced by material handling equipment, idling trucks on the site, and inefficient hauling. Noise is produced by material handling equipment and idling trucks on the site. The material is handled multiple times, requiring human and capital resources at each handling event. The trucks hauling the waste away may volume out before weighing out, as the material is unprocessed and may not be dense. The unprocessed material may also have a high moisture content, causing the material to be heavier and more expensive to transport. The use of a front-end loader limits the type of trailers and vehicles that can haul away the waste.

Therefore, there is a need for an organic material handling system and associated controller that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an organic material handling system, a storage module for an organic material handling system, and a control system for an organic material handling system. The organic material may compostable. The organic material may include organic waste or a mixture or organic wastes.

According to embodiments of the present invention, there is provided an organic material handling system comprising: a receiving module configured to receive organic material from a container vehicle and to move the organic material in a first direction toward an outlet of the receiving module, the organic material being discharged downward at the outlet of the receiving module; a transfer module configured to receive the organic material from the outlet of the receiving module, and to move the received organic material in a second direction toward an outlet of the transfer module; a storage module having an upper opening configured to receive and accumulate the organic material following handling by at least the transfer module; and a discharge module configured to receive the organic material from the storage module and to deliver the organic material from an outlet of the discharge module to a second container vehicle, the discharge module operable independently from at least the receiving module and the transfer module.

In various embodiments, the system further includes: a material processing module configured to mechanically process the organic material, and output the processed organic material; and a second transfer module configured to receive the organic material from the material processing module after processing, and to move the organic material toward an outlet of the second transfer module, wherein the storage module receives the organic material from the outlet of the second transfer module. In some further embodiments, the material processing module receives the organic material from one of the outlet of the transfer module, the storage module, and the discharge module. In some further embodiments, the material handling system further comprises a second material processing module which receives the organic material from one of the material processing module, the outlet of the transfer module, the storage module, and the discharge module.

In various embodiments, the material handling system further includes: a ramp configured to guide the container vehicle toward an inlet of the receiving module, the ramp comprising: a lower end in alignment with ground level; an elevated end elevated for positioning of the container vehicle relative to the inlet of the receiving module, the elevated end comprising at least one wheel chock; a left side guard and a right side guard, positioned stationary along the left and right side of the ramp to guide the container vehicle from the lower end to the elevated end; and a sensor configured to at least determine when the container vehicle is in a predetermined location on the ramp.

In various embodiments, at least one of the receiving module, the transfer module, the storage module and the discharge module is at least partially enclosed in a shell. In some further embodiments, the shell comprises a plurality of shell modules, at least one shell module in the plurality of shell modules being removable and adjustable allowing containment of the organic material within the material handling system. In some further embodiments, at least one shell module in the plurality of shell modules comprises at least one of a ventilation device and an air filtration device.

In various embodiments, one or more of the receiving module, the transfer module, and the discharge module are upwardly inclined.

In various embodiments, one or more of the receiving module, the transfer module, and the discharge module comprise at least one continuous loop conveyor.

In various embodiments, the system further includes one or more levelling bars, each levelling bar disposed in a spaced-apart configuration above an upper surface of an associated conveyor, the associated conveyor being one or more of: a conveyor of the receiving module, a conveyor of the transfer module, and a conveyor of the discharge module, each of the levelling bars configured to distribute the organic material on the associated conveyor. In some further embodiments, the one or more levelling bars are stationary or disposed on a continuous loop conveyor.

In various embodiments, the system includes a gate automatically adjustable between an open position and a closed position, wherein in the open position an opening is created for allowing the organic material from the container vehicle to be received by the receiving module, and in the closed position the opening is covered by the gate.

In various embodiments, one or more of the receiving module, the transfer module, and the discharge module comprises a respective chain conveyor comprising: at least two movable, continuous-loop chains; and a plurality of cross-links each coupled to each continuous-loop chain, the cross-links configured to engage with and move components of the organic material.

In various embodiments, the organic material being discharged downward at the outlet of the receiving module falls a predetermined distance configured to cause processing of the organic material during said falling, upon impacting the transfer module, or a combination thereof.

In various embodiments, the system further comprises a de-clumping device configured to decrease the size of components of the organic material impacting the transfer module.

In various embodiments, the second direction of the transfer module has a horizontal directional component which is parallel to a width direction of the receiving module.

In various embodiments, the second transfer module moves the organic material along a third direction, the third direction being different from the second direction of movement of the organic material by the transfer module. In some further embodiments, a horizontal component of the third direction is perpendicular to a horizontal component of the second direction.

In various embodiments, the system includes a hopper configured to receive the organic material from the transfer module and direct the organic material into the material processing module.

In various embodiments, the system includes one or more liquid capture system configured to at least capture and retain liquid expelled by the organic material.

In various embodiments, the storage module further comprises an internal conveyor disposed in a bottom region of the storage module and configured to move the organic waste from the storage module onto the discharge module when the discharge module is operating. In some further embodiments, the storage module further comprises a levelling conveyor disposed in a top region of the storage module, the levelling conveyor configured to distribute the organic material internally within the storage module. In some further embodiments, one or both of the internal conveyor and the levelling conveyor is a chain conveyor comprising at least two movable, continuous-loop chains and a plurality of cross-links, each cross-link coupled to each continuous-loop chain, the cross-links configured to engage with and move components of the organic material.

In various embodiments, the system includes a second storage module in communication with and receiving and accumulating the organic material directly or indirectly from one or more of: the receiving module, the transfer module, and the storage module.

In various embodiments, the system includes a second material processing module configured to receive the organic material directly or indirectly from one or more of: the receiving module, the transfer module, the second transfer module, the material processing module, and the storage module.

According to embodiments of the present invention, there is provided a method of handling an organic material, the method comprising: by a receiving module: receiving the organic material from a container vehicle, moving the organic material in a first direction toward an outlet of the receiving module, and discharging the organic material downward at the outlet of the receiving module; by a transfer module: receiving the organic material falling from the outlet of the receiving module and moving the received organic material in a second direction toward an outlet of the transfer module; by a storage module having an upper opening: receiving and accumulating the organic material following handling by at least the transfer module; and by a discharge module: receiving the organic material from the storage module delivering the organic material from an outlet of the discharge module to a second container vehicle, the discharge module operable independently from at least the receiving module and the transfer module.

According to embodiments of the present invention, there is provided a control system for controlled handling of an organic material, comprising: an unloading user console configured to receive input related to unloading of the organic material by a container vehicle; a loading user console configured to receive input related to loading of the organic material into a second container vehicle; a plurality of sensors configured to detect a quantity of the organic material in at least one location during the handling of the organic material; and a processing unit configured to process input from at least one of the unloading user console, the loading user console, and the plurality of sensors.

In various embodiments in relation to the control system, the organic material is handled by at least: a receiving module configured to receive organic material from a container vehicle and to move the organic material in a first direction toward an outlet of the receiving module, the organic material being discharged downward at the outlet of the receiving module; a transfer module configured to receive the organic material from the outlet of the receiving module, and to move the received organic material in a second direction toward an outlet of the transfer module; a storage module having an upper opening configured to receive and accumulate the organic material following handling by at least the transfer module; and a discharge module configured to receive the organic material from the storage module and to deliver the organic material from an outlet of the discharge module to a second container vehicle, the discharge module operable independently from at least the receiving module and the transfer module. The control system may be operatively coupled to and control some or all of these modules. The control system's sensors may be integrated with some or all of these modules.

In various embodiments, the control system further includes a signaling device in communication with the control system, the signaling device comprising: a plurality of indicators, each indicator indicating an action to be taken by the container vehicle or an action being performed by at least one module handling the organic material.

In various embodiments in relation to the control system, the plurality of sensors are configured to sense at least one of: a weight of the organic material, a volume of the organic material, and a height of the organic material, and the processing unit is configured to operate at least one of the receiving module, the transfer module, the storage module and the discharge module based at least in part on output of at least one of the plurality of sensors.

In various embodiments, the control system includes a remote radio control subsystem configured to control one or more of the receiving module, the transfer module, the storage module and the discharge module based on operator input received via the remote radio control subsystem.

In various embodiments, the control system is configured to determine a control precedence two or more input subsystems including the loading user console and the unloading user console, the control precedence indicative of which of the input subsystems the control system is responsive to when a conflict between commands received via the two or more input subsystems occurs.

In various embodiments in relation to the control system, the plurality of sensors comprises sensors configured to detect one or more accumulating volumes of the organic material at one or more locations within a system handling the organic material, the system being controlled by the control system. In some further embodiments, the control system is configured to adjust speed of one or more conveyors of the system handling the organic material based at least in part on output of the sensors configured to detect one or more accumulating volumes. In some further embodiments, the control system is configured to maximize a rate at which the organic material is transported from an organic material input to an organic material storage module, said rate being maximized based on an indication of material accumulating at one or more critical points in between the organic material input and the organic material storage module.

In various embodiments, the control system is further configured to operate the discharge module to deliver a first controlled amount of the organic material from the outlet of the discharge module to the second container vehicle during a first period of time and deliver a second controlled amount of the organic material from the outlet of the discharge module to the second container vehicle during each of one or more second periods of time, the first period of time and each of the one or more second periods of time beginning at operator-specified time instances.

In various embodiments in relation to the control system, the container vehicle accesses the receiving module via a ramp to deliver the organic material. In some further embodiments, at least one of the ramp and the receiving module comprise at least one sensor configured to determine a position of the container vehicle on the ramp or relative to the receiving module.

In various embodiments, the control system includes a communication interface, and the control system is configured to automatically communicate, via the communication interface, with a remote dispatch center when either the weight or volume of stored organic material meets or exceeds a configurable limit.

In various embodiments, the control system includes one or more input devices configured to automatically obtain information directly from a vehicle, or from a card or other device managed by an operator of the vehicle.

In various embodiments, the control system is further configured to unload a preselected amount of the organic material automatically to the second container vehicle, the preselected amount being less than a capacity of the second container vehicle, and subsequently present a manual control mode responsive to manual operator control to unload an additional amount of the organic material to the second container vehicle.

In various embodiments. the control system includes a plurality of operator-configurable settings, accessible via at least one user console, the operator-configurable settings comprising one or more of: one or more conveyor speeds; and one or more delays between specified conditions and specified actions. In some further embodiments, the operator-configurable settings are adjustable upon proper authorization credentials being received.

According to embodiments of the present invention, there is provided a method comprising, by an automatic control system: receiving, by an unloading user console, input related to unloading of organic material by a container vehicle; receiving, by a loading user console, input related to loading of the organic material into a second container vehicle; detecting, by a plurality of sensors, a quantity of the organic material in at least one location during handling of the organic material; and processing, by a computer processing unit, input from at least one of the unloading user console, the loading user console, and the plurality of sensors. In various embodiments the organic material is handled by an organic material handling system as described elsewhere herein.

According to embodiments of the present invention, there is provided an organic material storage module comprising: a hollow enclosure having an inlet for receiving organic material and an outlet for discharging organic material; a removal component disposed within the hollow enclosure and configured to move organic material within the enclosure toward the outlet; and a leveling component disposed within the hollow enclosure above the removal component and comprising one or more movable components configured to laterally push organic material which is stacked to a height of said movable components, for distribution of said organic material within the hollow enclosure.

In various embodiments, the organic material storage module further includes one or more sensors configured to determine total weight or volume of organic material stored within the hollow enclosure. In some further embodiments, at least one of the one or more sensors is configured to determine characteristics of a spatial distribution of organic material stored within the hollow enclosure.

In various embodiments, the organic material storage module further includes a bottom containment system configured to inhibit the organic material from contacting ground. In some further embodiments, the removal component is a continuous loop conveyor. In some further embodiments, the bottom containment system comprises a capture surface located below the removal component, the capture surface configured to catch organic material that fails to be transferred to the outlet, the removal component configured to pull said organic material that fails to be transferred to the outlet toward an end of the organic material storage module opposite the outlet and to reintroduce said organic material that fails to be transferred to the outlet into the hollow enclosure. In some further embodiments, the storage module further includes a return pan located at the end of the organic material storage module opposite the outlet, the return pan comprising: a first piece having a first end which overlaps with and is located under the capture surface, the first piece further having a curved section which curves around an end of the removal component to guide organic material upward back toward the hollow enclosure; and a second piece which overlaps overtop of a floor of the hollow enclosure and extends toward the curved section to capture said organic material guided upward back toward the hollow enclosure, the first piece and the second piece being movable with and end of the removal component which is located at said end of the organic material storage module opposite the outlet. In various embodiments, the bottom containment system comprises one or more liquid collection systems configured to receive liquid expelled from the organic material and direct said liquid toward a collection point.

In various embodiments, the organic material storage module further includes a control system configured to operate the removal component, the leveling component, or both, based at least in part on output of the one or more sensors.

In various embodiments in relation to the organic material storage module, the sensors comprise one or more of: one or more load cells configured to measure total weight of organic material within the hollow enclosure; two or more load cells configured to measure total weight of organic material within the hollow enclosure; and one or more sensors configured to measure total weight of organic material within the hollow enclosure and total volume of organic material within the hollow enclosure.

In various embodiments in relation to the organic material storage module, one or both of the removal component and the leveling component comprise respective chain conveyors.

In various embodiments in relation to the organic material storage module, the inlet is located in a top of the hollow enclosure proximate to a first end of the hollow enclosure, and the outlet is located proximate to a bottom of the hollow enclosure at a second end of the hollow enclosure, the second end opposite the first end.

In various embodiments in relation to the organic material storage module, a roof of the hollow enclosure is rounded. In some embodiments, the roof is at least partially covered by a flexible cover.

In various embodiments. the organic material storage module further includes an air circulator to move air into or out of the storage module.

In various embodiments in relation to the organic material storage module, the removal component and the levelling component are powered by electric motors. In various embodiments in relation to the organic material storage module, the removal component and the levelling component are powered by electric motors are located externally to the hollow enclosure.

According to embodiments of the present invention, there is provided a method comprising: receiving, at an inlet of a hollow enclosure, organic material; discharging, at an outlet of the hollow enclosure, said organic material; by a removal component disposed within the hollow enclosure, moving organic material within the enclosure toward the outlet; and by a leveling component disposed within the hollow enclosure above the removal component, laterally pushing organic material which is stacked to a height of said movable components, for distribution of said organic material within the hollow enclosure. The method may further include, using one or more sensors, determining total weight or volume of organic material stored within the hollow enclosure.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
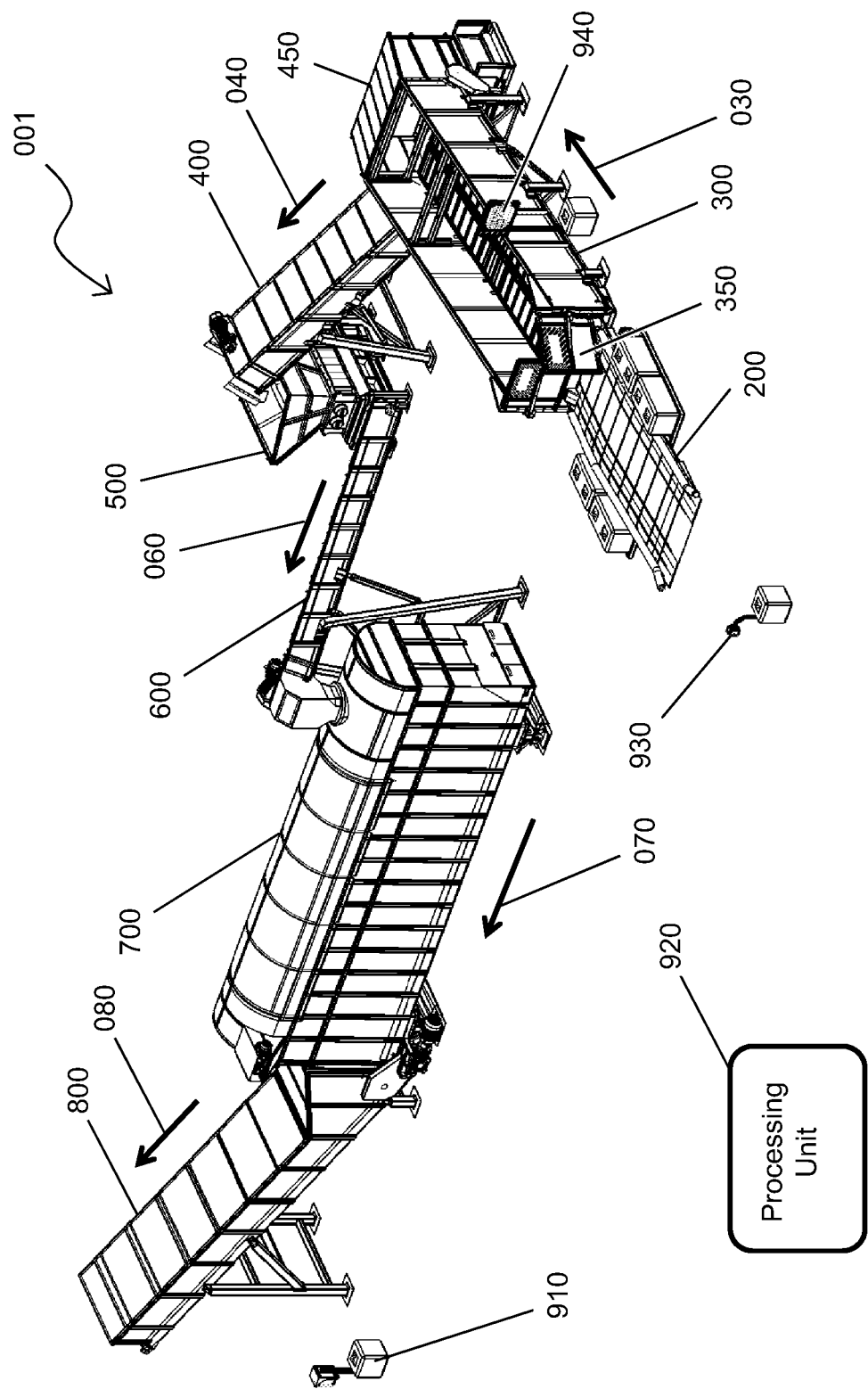
FIG. 1 is a schematic illustration of a material handling system, in accordance with an embodiment of the present disclosure.

Unless defined otherwise, all technical and scientific terms used herein have the same meaning as commonly understood by one of ordinary skill in the art to which this invention belongs. The numbers and numbers combined with letters correspond to the component labels in all the figures.

Embodiments of the present invention relate to an organic material handling system including a receiving module for receiving the organic material, a transfer module for moving the organic material, a storage module for receiving and accumulating the organic material, and a discharge module for discharging the organic material from the material handling system.

In embodiments, the material handling system of the present disclosure may be contained, automated, may process and store organic (e.g. compostable) material (e.g. waste). Certain example embodiments are described below. The term organic material, as used in various embodiments of the present disclosure, may refer, for example, to municipal compostable waste, industrial compostable waste, manure, brush from land clearing, any other bulk material that is mainly organic in nature but may also include amounts of sand or other minerals. The applications of various embodiments of the material handling system of the present disclosure may not necessarily be limited to organic material and may be utilized for other bulk or aggregate materials which may benefit from various embodiments of the present disclosure. Organic material may be a material that is generated or accumulated over a period, and benefits from processing and/or semi-contained storage prior to being loaded into a means of transportation. This material may be biosolids, branches and other green waste, compostable food waste, animal carcasses or animal by-products, wood chips, or other material. The moisture content of such materials may vary widely. The material handling system in various embodiments may allow for multiple types of organic material to be input, processed, stored, and discharged together. For example, it may be beneficial to augment household compostable organic material with woody material to improve the overall composting characteristics and/or texture of the material.

In embodiments, structures may be used to support, raise, lower, elevate or otherwise position and orient various parts and components of the material handling system. Structures may be connected to each other and to various parts and components of the material handling system by welding, machining, use of pins, bolts and other connecting means as understood by a person skilled in the art. Structures may include supports, blocks, landing gear (e.g. manually-operated, hydraulically-operated or electrically-operated), chains, pins, and other structures as understood by a person skilled in the art of conveyor equipment, industrial equipment, and material processing.

In embodiments, a conveyor may include various features and components known to a person skilled in the art. For example, conveyor may include some or all of a head pulley, a tail pulley, a driving assembly, a gearbox, a take-up adjuster, a belt cleaner, a conveyor belt, a conveyor frame, guards, flashing, skirting and other components known in the art. At least one of the conveyors of the material handling system may be a chain conveyor having at least two movable, continuous-loop chains and a plurality of cross-links each coupled to each continuous-loop chain, the cross links configured to engage with and move components of the organic material. Between the cross links there may be spaces allowing material to fall through. A surface may be located between a top portion of the chain conveyor which moves in one direction and a bottom (return) portion of the chain conveyor which moves in the opposite direction. This surface may support material so that it is consistently moved in one direction by the chain conveyor top portion. However, in the case of a levelling component (see storage module) or other moving levelling bars implemented using a chain conveyor, this surface is omitted allowing material to fall through the plane of such chain conveyor.

Embodiments may include several conveyors. A receiving conveyor may be capable of receiving organic material. A transfer conveyor may be capable of receiving organic material from the receiving conveyor, and conveying it into a material processing module. A second transfer conveyor may be receiving organic material from the material processing module and conveying it into a storage module. A discharge conveyor, may be transporting organic material from the storage module into a container, trailer, truck bed, or other item capable of receiving organic material from the material handling system.

In various embodiments, some or all of the conveyors may be chain conveyors having two continuous loop, driven chains with solid perpendicular cross-links designed to engage and move the material. However, these conveyors may also be continuous belt conveyors, other types of conveyors, or augers.

In embodiments, various modules of the material handling system may include one or more levelling bars. Each leveling bar may be disposed in a spaced-apart configuration above an upper surface of the one or more conveyors of a respective module. Each of the levelling bars may be configured to distribute the organic material on the one or more conveyors. One or more levelling bars may be stationary or may be disposed on a further continuous loop conveyor. In some embodiments, one, two or more levelling bars are provided at least in the receiving module.

In some embodiments, two or more different levelling bars may be located at two or more different respective heights above a same conveyor upper surface. Furthermore, in some embodiments, at least two of these two or more different levelling bars may be located at a same distance from a same end of the conveyor in a vertically stacked arrangement. Additionally or alternatively, at least two of these two or more different levelling bars may be located at different distances from a same end of the conveyor in a horizontally staggered arrangement. The multiple levelling bars may cooperate to perform a sequence of incremental levelling or "knocking down" operations, to progressively reduce the stacked height of material on the conveyor. Stacked height is reduced by the levelling bar impeding the progression of an upper portion of the material along the conveyor, while a lower portion is allowed to progress. This breaks away the upper portion of the material, until it subsequently falls into a subsequent gap in material travelling along the conveyor. By using multiple levelling bars in sequence, each levelling operation can be made to have less impact overall, thus facilitating a more reliable spreading of material over a length of the conveyor. Levelling bars can be rectangular, circular, triangular, or otherwise shaped.

In embodiments, various modules of the material handling system may include a shell (e.g. an enclosure). A shell may include shell modules which may attach (e.g. removable, adjustably) to various parts of modules of the material handling system and may contribute to containing the organic material to inside of the associated module, preventing access to the organic material (e.g. to personnel, precipitation, animals, insects), containing gases (e.g. to reduce smell and odours associated with organic material) that may escape the organic material, containing moisture and liquids that may escape the organic material, creating a barrier between the organic material and environmental and weather elements, and combinations thereof. Some modules of the shell may include a ventilation device, an air filtration device, and combinations thereof, which may contribute to reducing accumulation of gases within an associated module.

In embodiments, some or all modules and their respective parts may be accessible and include working space around serviceable parts where possible. Accessibility may be provided immediately or with minimal adjustments, such opening doors; removing access panels; and removing of bolts, screws, pins or similar hardware. Module parts that are directly or indirectly involved in operating the respective module or the while material handling system (e.g. electric motors) may be located externally to the respective module, and may be readily accessible even when the respective module is filled to capacity with the organic material.

In embodiments, sensors may refer to devices configured to perform measurements or otherwise obtain information and provide such information to an electronic controller. Examples of sensors include weight sensors, cameras, radar sensors, lidar sensors, heat sensors, gas sensors, moisture sensors, vibration sensors, conveyor velocity or motion sensors, volume sensors, etc.

In embodiments, a controller can be provided and coupled to sensors, actuators (e.g. motors), user input interfaces, user output interfaces, alarms, an interface with a remote communication system (e.g. a wired or wireless communication system, and cellular service or Internet service interconnect), etc. The communication system may include a dispatching system which communicates with vehicles to schedule organic material pickup or drop-off actions. A controller is generally an electronic device and may include one or more computers, programmable logic controllers, microcontrollers, electronic circuits, collections of relays, etc. A controller, or more generally a control system including the controller, sensors, actuators, user interfaces, etc. may provide for a degree of automation by performing various actions (e.g. starting or stopping conveyors or other devices, opening gates, notifying users to take certain actions, etc.) automatically in response to detecting predetermined conditions.

As used herein, a module may be a material handling device such as a conveyor, container, ramp, electronic control system, etc.

FIG. 1 shows a schematic illustration of the material handling system 001, according to an embodiment.

In various embodiments, the material handling system may accept organic material from a variety of (container) vehicles (not shown). A container vehicle may be a dump trailer, a dump truck, a municipal waste truck and/or trailer, a compost collection vehicle, a loader (e.g. front-end), an excavator, or any other vehicle capable of receiving, containing (holding), moving, and discharging a quantity of organic material, as understood by a person skilled in the art.

In embodiments, the material handling system 001 may be managed by an automated and possibly remotely-controlled or managed control system. The control system may include various components such as a processing unit 920, described elsewhere herein; an unloading user console 930, described elsewhere herein, which may be accessed by an operator of the container vehicle, for example, and may be used to enable the material handling system to receive the organic material. The processing unit may be a computer processor executing computer program instructions stored in memory, a programmable logic controller, or the like. The control system may also include a signalling device 940, described elsewhere herein, which may be used to notify the operator of the container vehicle of the status of the material handling system, for example. The control system may also include a loading user console 910, as described elsewhere herein, which may be used by an operator of a second container vehicle, for example, to enable the discharge of the organic material from the material handling system into the second container vehicle.

In embodiments, the container vehicle may access the material handling system via a ramp 200. A gate 350 may be used to allow the container vehicle to access a receiving module 300 when the material handling system is ready to receive organic material. The gate 350 may also prevent the container vehicle from discharging the organic material into the receiving module 300 when the material handling system is not ready to receive organic material at a particular time. The gate may be configured to open for example upon sensing the vehicle is in a correct location and that the system is ready to receive the organic material.

After discharging the organic material into the receiving module 300, for example via the opened gate 350, the container vehicle may exit the ramp 200.

The organic material then begins its journey through the material handling system.

The receiving module may include one, two, or more levelling bars (304a, 304b in FIG. 2A) as described above to distribute the load across the receiving module. The levelling bars engage with the organic material as it moves through the receiving module due to conveyor action. The levelling bars facilitate a spreading out of the organic material from a more vertically stacked arrangement to a more horizontal arrangement. At the same time, the levelling bars may assist in a decompression of the organic material or other type of desired physical processing of the organic material (e.g. increasing air content or volume, decreasing moisture content, etc.). This may be due to agitation and breaking apart of the organic material due to contact with the levelling bars.

The organic material continues its journey through the material handling system, it may pass, via a connecting module, into an inclined transfer module positioned at a somewhat perpendicular angle to the receiving module. When transferring onto the transfer module, the organic material may fall a distance allowing the organic material to break up and expand, for example.

As illustrated in FIG. 1, the organic material received by the receiving module 300 is moved into a transfer module 400 via a connecting module 450. In some embodiments the connecting module simply acts as a container or shell for the organic material, and may in some cases be omitted. In embodiments, the organic material being discharged by the receiving module 300 falls downward towards a surface (e.g. a conveyor) of the transfer module 400. The surface may be moving in the sense that the entire surface moves or the surface is integrated with moving components such as a chain conveyor. The organic material may fall downward a pre-determined distance, which may be adjustable for example by adjusting the height or angle of the receiving module. The fall distance may contribute to the various components of the organic material being separated into smaller components. In addition or alternatively, the fall distance may also contribute to all or some of a decompression of the organic material, an increase in volume of the organic material (e.g. by increasing the air content), a decrease in moisture content of the organic material (e.g. by some moisture exiting the organic material as result of impact after falling downwards).

In embodiments, the organic material being discharged from the transfer module 400 may be received by a material processing module 500. After being processed by the material processing module 500, the organic material may be received by a second transfer module 600. The second transfer module 600 may be similar to the transfer module 400.

In embodiments, the second transfer module 600 may discharge the organic material into a storage module 700, which may accumulate the organic material up to a pre-determined amount, for example. In embodiments, after the storage module 700 has accumulated a pre-determined amount of the organic material, the control system may trigger the material handling system to stop discharging any more organic material into the storage module 700. In embodiments, the control system may trigger an arrival of the second container vehicle to receive the organic material from the storage module 700 via a discharge module 800. The discharge module 800 may receive the organic material form the storage module 700 and discharge it into the second container vehicle when the second container vehicle is ready to receive the organic material. The readiness of the second container vehicle to receive the organic material may be determined by the control system, for example, via corresponding input by an operator (e.g. the operator of the second container vehicle) into the loading user console 910, or, either in addition or alternatively, by one or more sensors that detect a present of the second container vehicle in a pre-determined location to receive the organic material.

In embodiments, the amount of material discharged by the discharge module 800 and received by the second container vehicle may be determined automatically by one or a combination of one or more sensors (e.g. by estimating a capacity of the second container vehicle); by input into the control system either remotely or via the loading user console; and by setting a recurring amount into the control system.

In various embodiments, the organic material can be added to the receiving module, or directly into the material processing module, for example by an excavator or other vehicle with an appropriate reach.

In various embodiments, the various ramps, consoles and modules of FIG. 1, such as devices 200, 300, 400, 500, 600, 700, 800, 910, 920, 930, can be provided in a modular manner. That is, each of these different devices can be separate and self-contained. Each of these different devices may be individually transportable for easy setup at a temporary or permanent location. The different devices can be arranged together in any one of a variety of layouts, depending on available space and terrain. Furthermore, the system may be modular in the sense that different sets, arrangements and/or orderings of devices can be achieved using a common set of available devices. For example, the material processing module is omitted, one of the transfer modules can be omitted, multiple receiving modules, storage modules or discharge modules can be provided, etc. Modules can be arranged in parallel so that they each feed into a same next module, or so that they receive output from multiple upstream modules.

Where possible, horizontal conveyor angles of the material handling system may be designed to allow flexibility to accommodate various site considerations and limitations.

In embodiments, directions may be decomposed into horizontal components and vertical components in a Cartesian manner so that adding the horizontal directional component with the vertical directional component results in the overall direction. With this in mind, a horizontal component of a first direction 030 of the organic material movement by the receiving module 300 may be substantially perpendicular to a horizontal component of a second direction 040 of the organic material movement by the transfer module 400. Having differing directions may assist in breaking up the organic material, due to imparting direction-changing forces thereon. Furthermore, in some embodiments, the horizontal component of the second direction 040 is parallel to a width direction of the receiving module 300, and thus perpendicular to the horizontal component of the first direction 030. This facilitates a direction change and also allows for a width difference between the conveyors of the receiving module and the transfer module. However, some embodiments may include non-perpendicular arrangements between the horizontal component of the first direction 030 and the horizontal component of the second direction 040. For example, in some embodiments, the horizontal component of the first direction 030 and the horizontal component of the second direction 040 may be substantially the same.

In embodiments, the horizontal component of the second direction 040 of the organic material movement by the transfer module 400 may be substantially perpendicular to the horizontal component of a third direction 060 of the organic material movement by the second transfer module 600. However, some embodiments may include non-perpendicular arrangements between the horizontal component of the second direction 040 and the horizontal component of the third direction 060. In some embodiments, the horizontal component of the second direction 040 and the horizontal component of the third direction 060 may be substantially the same.

In embodiments, the horizontal component of the third direction 060 of the organic material movement by the second transfer module 600 may be substantially perpendicular to the horizontal component of a fourth direction 070 of the organic material movement by (e.g. a conveyor within) the storage module 700. However, various embodiments may include non-perpendicular arrangements between the horizontal component of the third direction 060 and the horizontal component of the fourth direction 070. In some embodiments, the horizontal component of the third direction 060 and the horizontal component of the fourth direction 070 may be substantially the same. The receiving area of the storage module may receive the organic material at a wide range of (horizontal) angles (up to 270 degrees or greater), allowing for a flexible layout of modules to accommodate for various operating site footprint requirements, for example.

In embodiments, the horizontal component of the fourth direction 070 and the horizontal component of a fifth direction 080 of the organic material movement by the discharge module 800 may be substantially the same. In other embodiments, these two horizontal components of direction may be different.

In embodiments, each or some of respective arrangements of directions 030, 040, 060, 070 and 080 may be predetermined, fixed, adjustable, custom-made to suit a specific operations site, and combinations thereof. Relative directions can be adjusted for example by rotating the placement of various associated modules, changing their angles of elevation, etc.

In embodiments, a receiving module may include a conveyor (or conveyors) which may be considerably wider (or the combined width of multiple conveyors) than other conveyors in the material handling system to allow for the full width of a trailer, truck, or loader bucket.

Figure 2A:
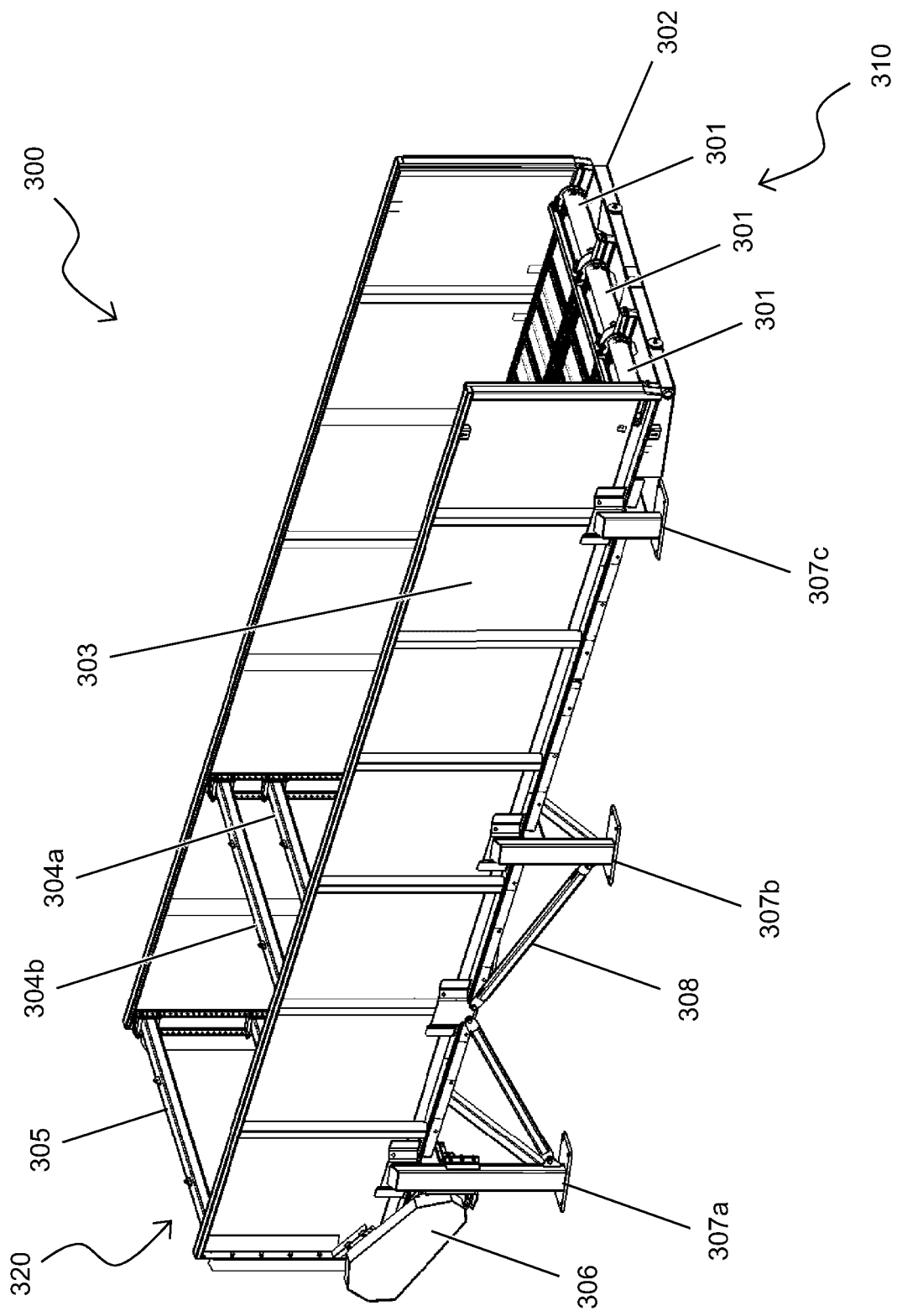
FIG. 2A is a schematic illustration of a receiving module, in accordance with an embodiment of the present disclosure.

FIG. 2A shows a schematic illustration of the receiving module 300, according to an embodiment.

The receiving module may have an inlet 310 receiving the organic material and an outlet 320 discharging the organic material.

In embodiments, the organic material may be loaded into the receiving module 300 having an opening in the top surface by a suitable loading equipment (e.g. a loader, a conveyor) capable of reaching sufficient height to discharge the organic material through the top of the receiving module (not shown).

One end of the receiving module 300 may be elevated over the opposite end (i.e. upwardly inclined). For example, the outlet 320 may be elevated in comparison to the inlet 310 with respect to the ground level. The receiving module 300 may be supported, for example, by one or more supporting legs 307a, 307b and 307c which may have same or different dimensions. Additional supporting structures, such as a cross bar 308, may be used for additional structural support, for example.

The receiving module 300 may include one or more conveyors 301 (e.g. closed loop conveyors, also referred to as continuous loop conveyors) arranged in parallel to move the organic material towards the outlet 320. The conveyors may be chain conveyors, or alternatively belt conveyors or other types of conveyors. The one or more conveyors 301 may be driven, for example, by a motor assembly 306. The receiving module 300 may include side walls 303. The left side wall may be same or different in structure and dimension to the right side wall. The receiving module 300 may include an output wall 305 at the outlet 320. The output wall 305 may be fixed or may be adjustable in position. An opening (not shown) formed between the output wall 305 and the one or more conveyors 301 may be used to discharge the organic material from the receiving module 300. The size of the opening may be fixed or may be adjustable, for example by positioning the output wall 305 higher or lower with respect to the conveyor. The output wall may be omitted, resulting in a relatively unimpeded opening at the outlet end 320.

The receiving module 300 may include levelling bars 304a and 304b which may be stationary. The leveling bar 304a may be disposed closer to the one or more conveyors 301 than the leveling bar 304b. Each leveling bar may contribute to distributing the organic material on the one or more conveyors 301 as they operate.

The receiving module 300 may include a base 302 which may provide support to the receiving module 300, may contribute to containing the organic material and preventing it from escaping the receiving module 300 (e.g. except from an outlet), may contribute to collecting moisture from the organic material, and combinations thereof.

The receiving module 300 may include a shell (not shown) which may be attached (e.g. removably, adjustably) to some or all of the side walls 303 and output wall 305. The cover may contribute to containing the organic material to inside of the receiving module 300, preventing access to the organic material (e.g. to precipitation, animals, insects). The shell may include the side walls 303 in addition to a roof or other top covering.

In various embodiments, once the material handling system is enabled (e.g. via a user input) for receiving the organic material, an electrically actuated gate in communication with the receiving module may open and the receiving conveyor (e.g. one or more conveyors 301 of the receiving module of FIG. 2A) is started. The organic material is discharged by the container vehicle onto the receiving conveyor, where it is pulled, for example by a chain conveyor into the material handling system.

The gate may open when the control system determines that the material handling system is ready to receive organic material. This determination may be based on sensors equipped on a ramp, inputs from an operator panel (e.g. unloading user console), or elsewhere.

Figure 2B:
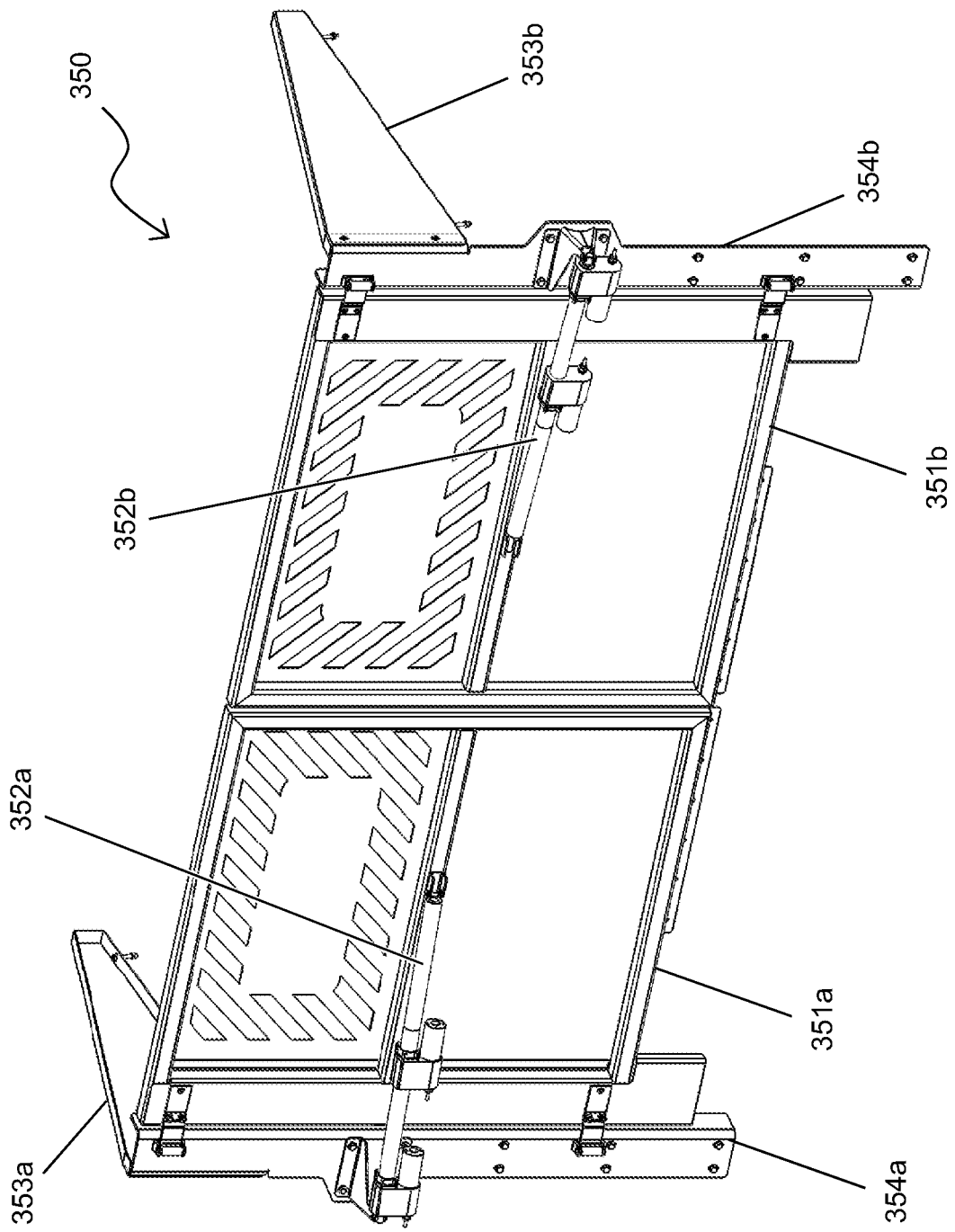
FIG. 2B is a schematic illustration of a gate of the receiving module, in accordance with an embodiment of the present disclosure.

FIG. 2B shows a schematic illustration of a gate 350 for a receiving module 300, according to an embodiment.

The gate 350 may include a left frame post 354a and a right frame post 354b. A left side panel 353a may be attached to the left frame post 354a. A right side panel 353b may be attached to the right frame post 354b. Frame posts and side panels may be secured to the inlet 310 of the receiving module 300. A left gate door 351a may be pivotably attached to the left frame post 354a. A right gate door 351b may be pivotably attached to the right frame post 354b. Both doors may pivot outward (away from the one or more conveyors 301) into an open position to allow access to the receiving module to a container vehicle. When both doors 3351a and 351b are in a closed position, they may be in contact with each other. Each gate door 351a and 351b may be moved between open and closed position using, for example, hydraulic or electric devices 352a and 352b, respectively. The devices 352a and 352b may be in communication with the control system which may monitor, log, and control the position of the gate doors via the respective devices.

The gate may be automatically adjustable between an open position and a closed position. In the open position, an opening may be created for allowing the organic material from the container vehicle to be received by the receiving module, and in the closed position the opening is covered by the gate.

In embodiments, at the outlet of the receiving module which may include at least one conveyor, the organic material may be transferred off the outlet and fall some distance onto a transfer module which may include at least one conveyor. This falling process onto a moving conveyor may contribute to breaking up the organic material, preventing large clumps of organic material from plugging a material processing module which may be further down the path of the organic material in the material handling system, or transitions located later in the material handling system.

In embodiments, other methods may be used to allow the organic material to expand and decompress to avoid clumps. For example, an inclined conveyor may be started and stopped, or run at a particular speed, which may cause the organic material to tumble on the conveyor. This tumbling action may assist in separating or otherwise processing the organic material in some situations. A controller with sensors may be used to initiate and tune such tumbling action. The controller may be a part of the control system, as described elsewhere herein.

In embodiments, once the organic material has fallen into the transfer module, it may be moved via a chain conveyor. In an embodiment, the transfer module conveyor may be significantly narrower and inclined more steeply than the receiving module conveyor. The transfer module conveyor may move the organic material to a hopper positioned above a material processing module, where it is fed by gravity into, for example, counter-rotating drums of the material processing module.

Figure 3:
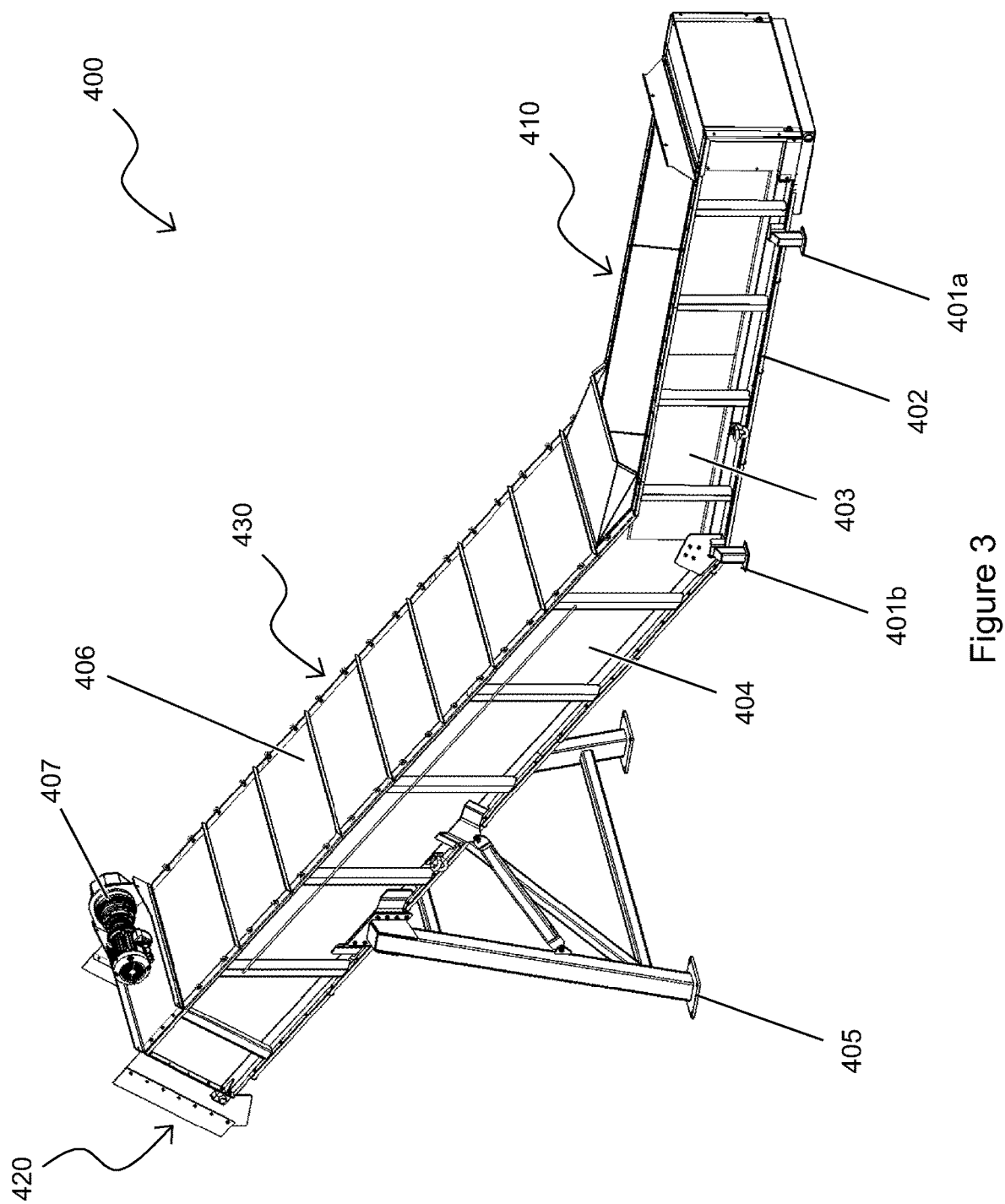
FIG. 3 is a schematic illustration of a transfer module, in accordance with an embodiment of the present disclosure.

FIG. 3 shows a schematic illustration of a transfer module 400, according to an embodiment.

The transfer module 400 may include one or more conveyors (not visible in FIG. 3 but located near a bottom of the hollow transfer module) which move the material from an inlet 410 to an outlet 420. The inlet 410 may include a hopper (not shown) to receive the organic material. The inlet 410 may be connected to a connecting module 450, described elsewhere herein.

The inlet 410 may include a supporting frame 402 and side and rear panels 403 which enclose the inlet 410 from corresponding sides. The inlet 410 may be supported by one or more supporting legs 401a and 401b, which may have same or different dimensions. The transfer module 400 may be upwardly inclined.

The transfer module 400 may include an elevated portion 430 which connects the inlet 410 to the outlet 420 which may be elevated. Some or all of the elevated portion 430 may be enclosed in side panels 404 on the left and right side and top cover panels 406, which may be connected to each nearest panel and form a shell, as described elsewhere herein. A one or more supporting structure 405 may support the elevated portion 430.

The one or more conveyors may be operated using a motor 407 (e.g. electric). As described elsewhere, the conveyors may be belt conveyors, chain conveyors, or the like. In some embodiments, at least one of the conveyors may be an auger or other similar device configured to move organic material of suitable composition (e.g. including size of constituent components, or range of sizes of constituent components).

Figure 4A:
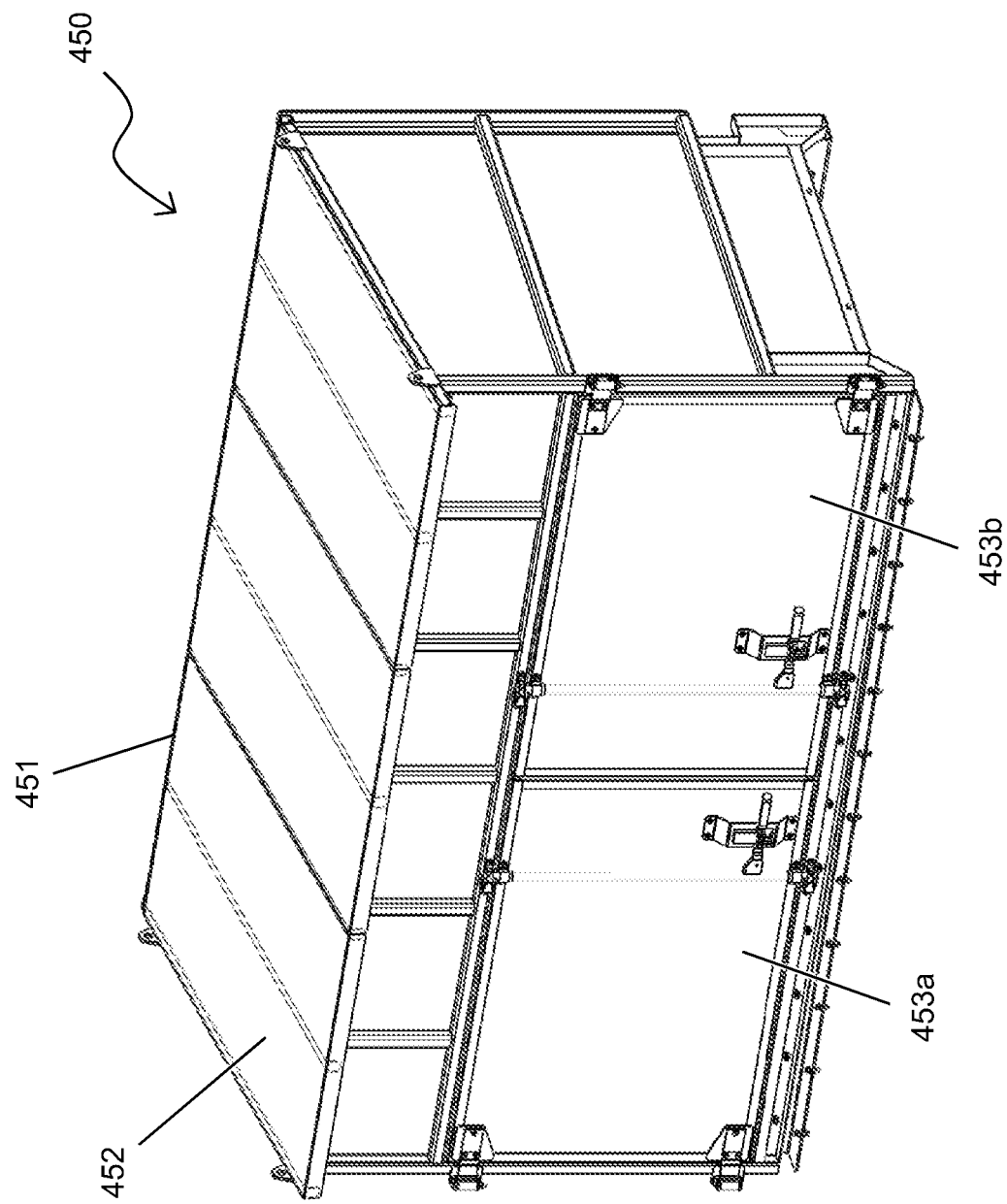
FIG. 4A is a schematic illustration of a connecting module, in accordance with an embodiment of the present disclosure.

FIG. 4A shows a schematic illustration of a connecting module 450, according to an embodiment.

In embodiments, the connecting module 450 may include various structures that enclose the organic material being moved from the receiving module 300 to the transfer module 400. Such structures may include frames, panels, guards, doors, access panels, sealing elements, flashing, skirting, bridges and other structures which may contribute to one or some of guiding, containing, and processing of the organic material being moved, as understood by a person skilled in the art.

The connecting module 450 may be connected to outlet 320 of the receiving module 300, to the inlet 410 of the transfer module 400, or to both.

The connecting module 450 may include a top cover 541 which may include cover panels 452, which may form a part of the shell, as described elsewhere herein. The connecting module 450 may include doors 453a and 453b which may provide access to the inside of the connecting module 450, for example, for maintenance and inspection.

Figure 4B:
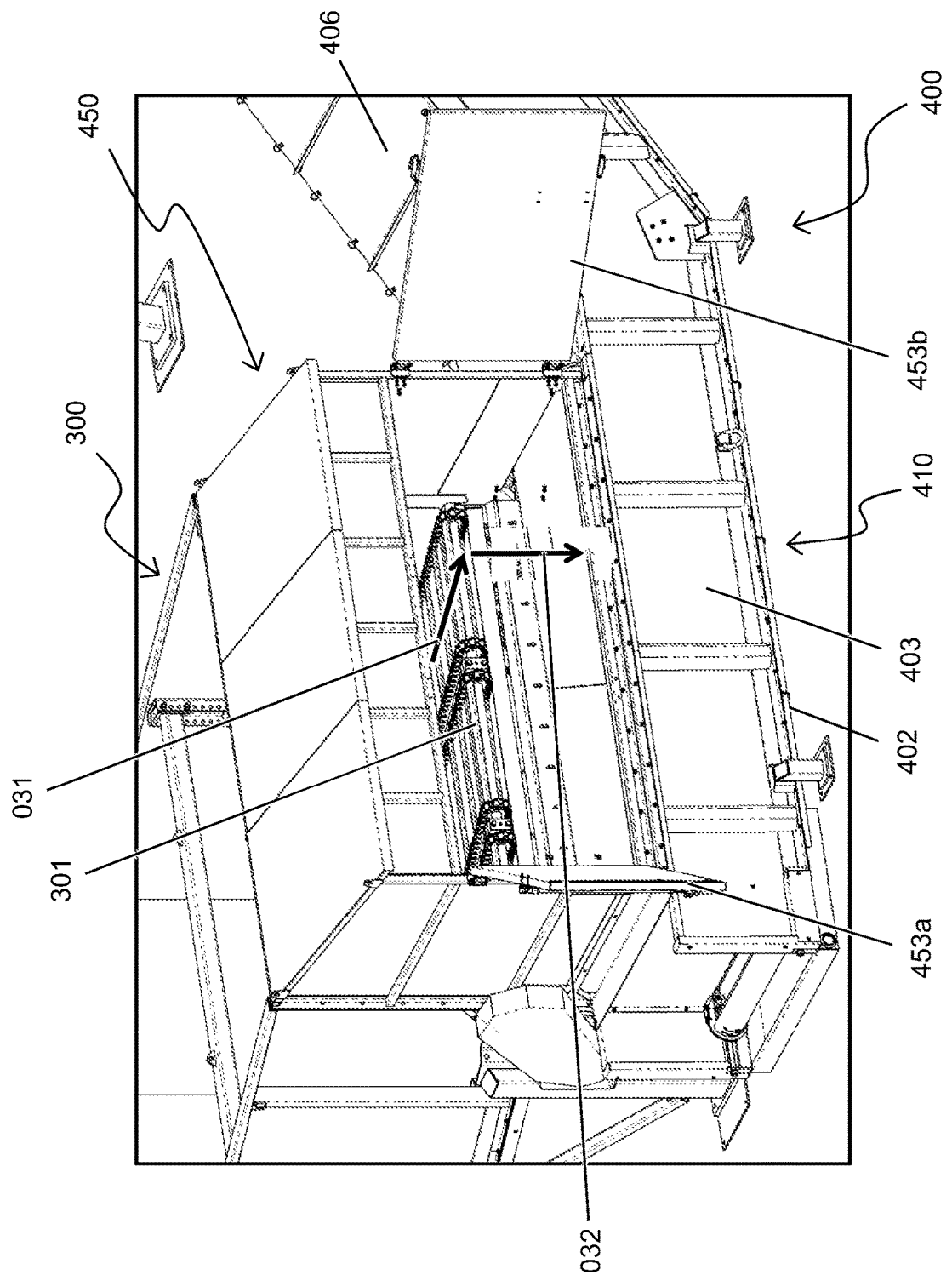
FIG. 4B is a schematic illustration of a connecting module connected to a receiving module and a transfer module, in accordance with an embodiment of the present disclosure.

FIG. 4B shows a schematic illustration of a connecting module 450 connected to the receiving module 300 and the transfer module 400 with doors 453a and 453b open, according to an embodiment.

The organic material being moved (e.g. as shown by directional arrow 031) by the one or more conveyors 301 of the receiving module 300 may be discharged downward (e.g. may fall down), as shown by the directional arrow 032, into the inlet 410 of the transfer module 400. The fall distance represented by the directional arrow 032 may be predetermined, for example, based on an optimum fall distance for the organic material to fall in order to increase the amount of air (or space) between components of the organic material that may be in close contact with each other (e.g. entangled, clumped, stuck, pressed together), which is an example of passive processing. The fall distance may be optimized based on specific organic material to be handled by the material handling system. Passive processing may occur when the organic material is partially or fully processed due to operations which also serve another purpose, for example transferring the organic material from one location to another. Thus, processing and transfer can occur together due to a single action.

The connecting module 450 and the outlet 320 of the receiving module 300 may include devices (not shown) contributing to passive processing of the organic material. An example of such devices includes a de-clumping device configured to decrease the size of components of the organic material impacting the transfer module. A de-clumping device may include a (e.g. freely) rotating wheel, a blade, or other structure disposed in the path of the organic material. As the organic material interacts with the device, the organic material components may break up and/or decrease in size due to impact force. As the organic material interacts with the device, it may, in addition or alternatively, be cut or torn by the device, resulting in decreased size of the components of the organic material. The organic material may then be redirected past the device to a desired next location. The device may have bumps, ridges, blades, spikes, etc. In an embodiment, a rotating wheel may assist in breaking up material due at least in part to its spinning motion.

At the outlet of the transfer module, the organic material may transfer into a hopper positioned above a material processing module such as a shredder. The organic material may be processed by the material processing module to a size and shape to allow for at least one of improved handling, improved storage, and improved composting. The material processing module may include an industrial shredder having an infeed hopper positioned above counter-rotating drums with cutting edges, designed to catch and shred materials, for example. The material processing module may include a grinder, shredder, compactor, or other device designed to transform the input organic material.

Figure 5:
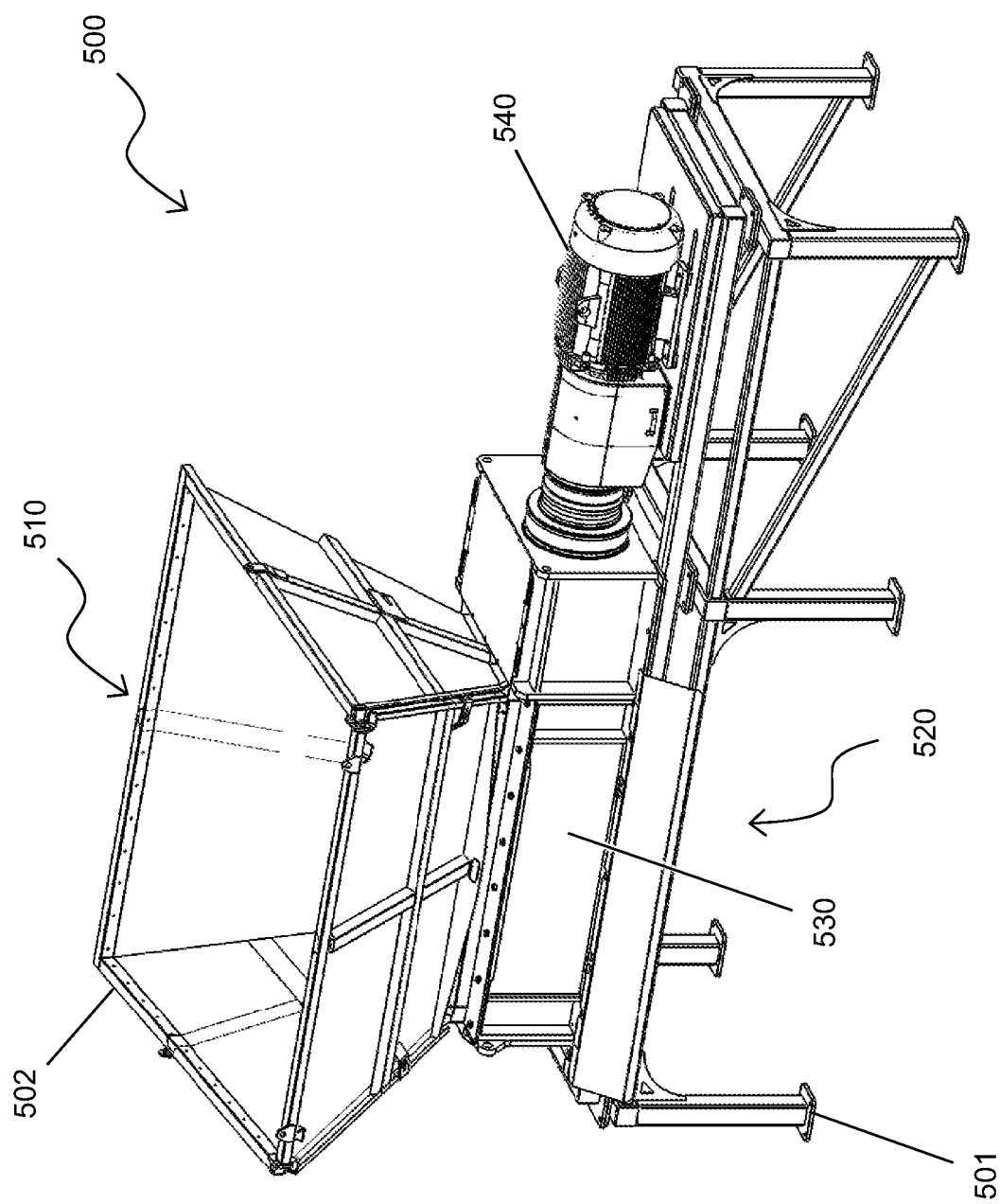
FIG. 5 is a schematic illustration of a material processing module, in accordance with an embodiment of the present disclosure.

FIG. 5 shows a schematic illustration of a material processing module 500, according to an embodiment.

In embodiments, the material processing module 500 includes a material processor 530 that receives, (e.g. mechanically) processes and discharges organic material after processing. Non-limiting examples of processing the organic material by the material processor 530 include shredding, breaking apart, mixing, combining, homogenizing, decreasing material density, increasing material volume, aerating, and otherwise processing the organic material. The material processor may be an industrial shredder with counter-rotating drums, for example.

After being processed by the material processor 530, the organic material may be discharged downward via an outlet 520.

In embodiments, an inlet 510 of the material processing module 500 may include a hopper 502 which may receive the organic material from the transfer module 400, for example, and direct it into the material processor 530. In embodiments, the hopper 502 may include an auger, a vibrating device, a gate, a door, a cover, an access panel, and other components that may be incorporated into a hopper, as understood by a person skilled in the art.

In embodiments, the material processing module 500 may include a motor 540 to operate the material processing module 500. The motor 540 may be electric for example.

In embodiments, the material processing module 500 may include a supporting structure 501, which may include a frame, supports, legs, guards and other components which may contribute to supporting the material processing module and its components.

In embodiments, the material processing module may discharge the processed organic material from its bottom downward to a conveyor of a second transfer module, which may be similar in design, width and/or angle to the transfer module. This conveyor may transport the material to an inlet of a storage module, for example, dumping into an upper opening of the storage module.

Figure 6:
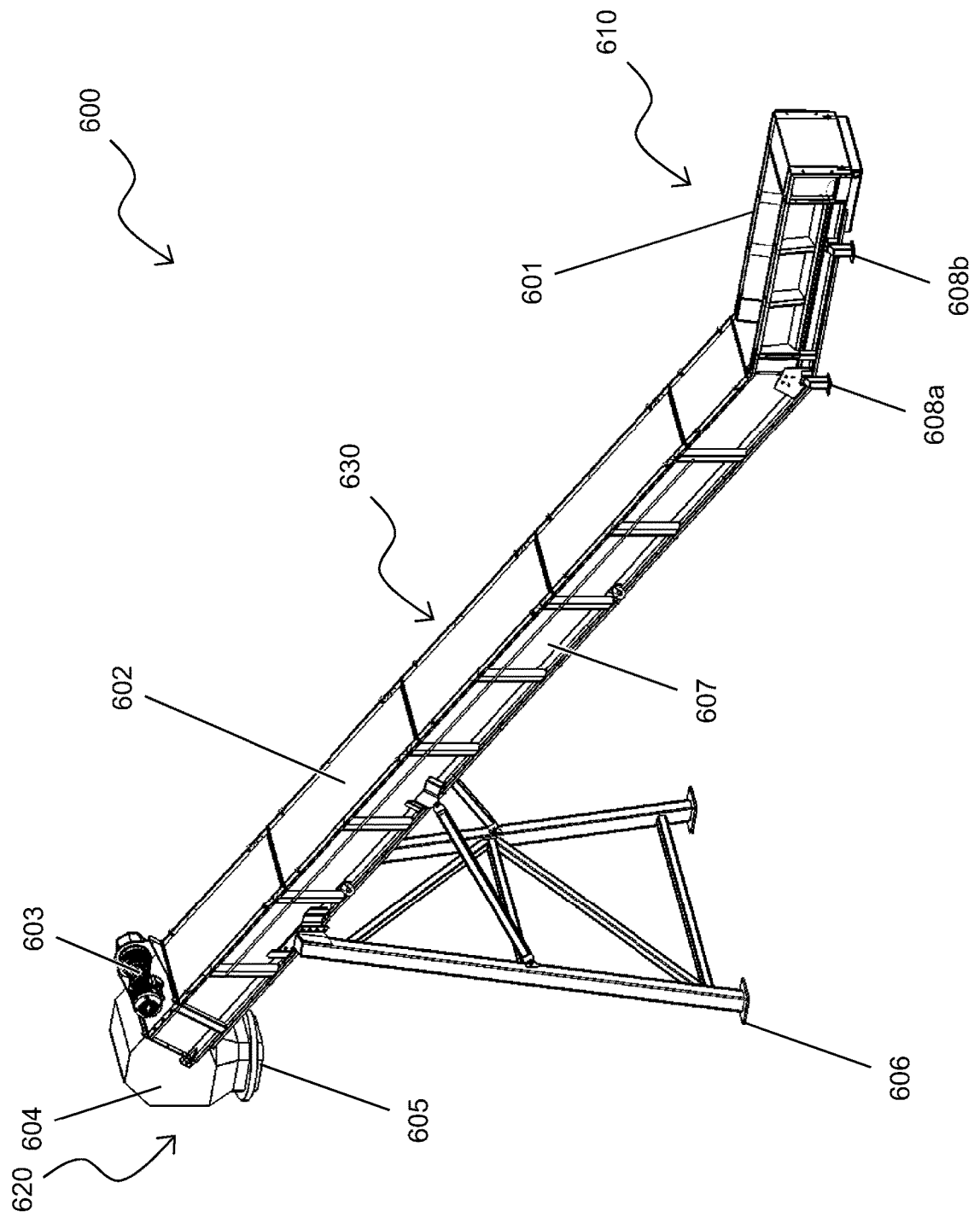
FIG. 6 is a schematic illustration of a second transfer module, in accordance with an embodiment of the present disclosure.

FIG. 6 shows a schematic illustration of a second transfer module 600, according to an embodiment.

In an embodiment, the second transfer module 600 may be substantially the same, at least in terms of general structure and function, as the transfer module 400, may have some features of the transfer module 400 as described above, or may be substantially different from the transfer module 400.

The second transfer module 600 may include one or more conveyors (not visible in FIG. 6) which move the material from an inlet 610 to an outlet 620. The inlet 610 may include a hopper (not shown) to receive the organic material. The inlet 610 may be connected to and receive the organic material from the material processing module 500, described elsewhere herein.

The inlet 610 may include side and rear panels 601 which enclose the inlet 610 from corresponding sides. The inlet 610 may be supported by one or more supporting legs 608*a* and 608*b*, which may have same or different dimensions. The second transfer module 600 may be upwardly inclined.

The second transfer module 600 may include an elevated portion 630 which connects the inlet 610 to the outlet 620 which may be elevated. Some or all of the elevated portion 630 may be enclosed in side panels 607 on the left and right side and top cover panels 602, which may be connected to each nearest panel and may form a shell, as described elsewhere herein. A one or more supporting structure 606 may support the elevated portion 630.

The one or more conveyors of the second transfer module 600 may be operated using a motor 603 (e.g. electric).

The outlet 620 of the second transfer module 600 may include a chute 604 to guide the organic material. An outlet opening 605 of the chute 604 may be coupled to a storage module 700, for example.

In various embodiments, the second transfer module's chute (e.g. discharge hood) may be designed to be positioned over the storage module at any angle within a 270-degree arc where the conveyor rails do not interfere with the storage module.

In embodiments, the material handling system may include more than one material processing module, arranged in series (e.g. the material processing module discharging the organic material into a second material processing module and so on), in parallel (e.g. a transfer module discharging the organic material into the material processing module may pivot and begin discharging the organic material into a second material processing module), or in combination thereof.

In embodiments, the material processing module may be receiving the organic material from other modules of the material handling system. The material handling system may include more than one material processing module, each material processing module receiving the organic material from a same other module or from a different other module. The organic material may be moved from one material processing module to another by a conveyor or by gravity feed in a stacked arrangement, for example.

Once processed by the processing module, the organic material may transfer, for example via the second inclined transfer module which takes the organic material to a storage module (e.g. storage container). In an embodiment, the storage module may include a (e.g. chain) conveyor for moving the bulk of the organic material from an input end of the storage module to the discharge end of the chain conveyor. As well, a distribution (e.g. chain) conveyor may operate near the top of the storage module, for example to level off and distribute organic material across the storage module once it reaches the height of the distribution conveyor.

Figure 7A:
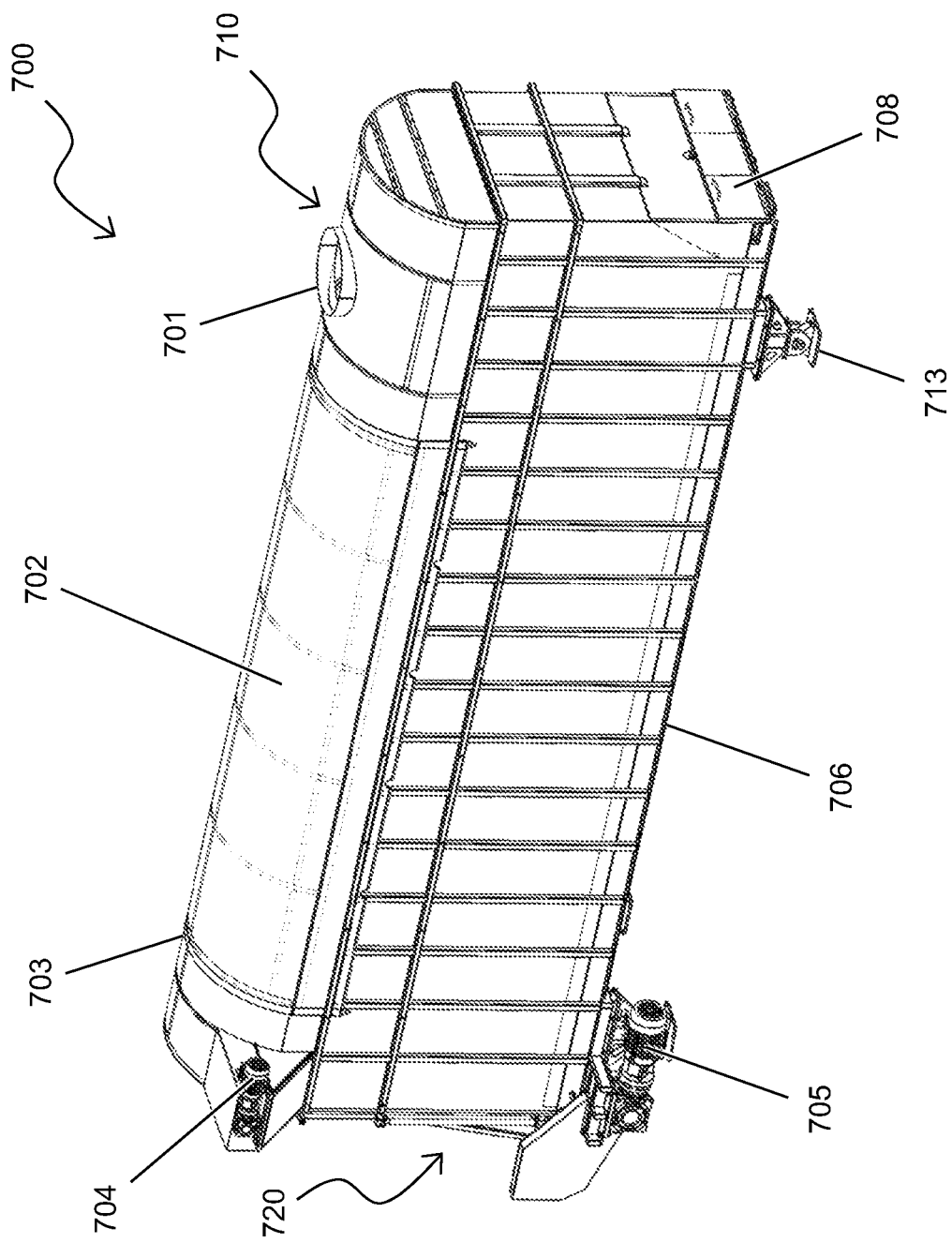
FIG. 7A is a schematic illustration of a storage module, in accordance with an embodiment of the present disclosure.

FIG. 7A shows a schematic illustration of a storage module 700, according to an embodiment.

The storage module 700 may include a body 706, which may have a bottom, side walls, and a rear wall, generally defining a hollow enclosure. The storage module 700 may include a roof 703 which may be rounded. The roof 703 may contain one or more panels 702. The one or more panels 702 may include a flexible (e.g. rain, snow, hail, wind) material (e.g. a tarp, a cover) resistant to weather elements which may be cost-efficient, simple to install, modify, and replace and provide easy access to the cavity of the storage module from the top. The footprint of the storage module 700 may be oblong, may be rectangular.

The storage module 700 may receive the organic material via an upper opening (i.e. an inlet) 701 that may be located in the roof 703. The upper opening 701 may be coupled to an outlet opening 605 of the chute 604 of the second transfer module 600 shown in FIG. 6, for example. The storage module may accumulate and store the organic material within its hollow enclosure until, for example, a container vehicle is available to receive the organic material from the storage module via the discharge module. The organic material may be received by the storage module in large amount over shorter period of time, leading to faster accumulation of the organic material in the storage module, or the accumulation may be gradual and intermittent over a period of time. Accumulating and storing the organic material in the storage module may contribute to reducing rapid increase and accumulation of the organic material.

The storage module 700 may include a removal component, which may be (or include) an internal conveyor such as a chain conveyor, disposed within the hollow enclosure of the storage module, for example in a bottom region thereof. The removal component may move the organic material within the enclosure of the storage module 700 toward an outlet 720 that may be on the opposite end of the storage module 700 than the upper opening 701, for example.

The organic material entering the storage module via the upper opening 701 may fall down into the hollow enclosure of the storage module and may accumulate in a pile below the upper opening 701. The whole accumulated pile or a bottom portion of the pile may be moved from an upper opening end 710 of the storage module to the outlet 720 by conveying action of the removal component.

The outlet 720 may include a door (not shown), which may be operated manually or by the control system, or both, to open a predetermined amount to allow the organic material to be discharged from the storage module to the discharge module 800, for example. When storing or accumulating the organic material inside the storage module, the door may be in a closed position to contain the organic material (i.e. preventing the organic material from exiting the storage module) 1.

The outlet 720 may include a knife gate (not shown) which may function as the door described above in addition to having an ability to cut (e.g. vertically, horizontally or otherwise) through the organic material as it is discharged from the storage module.

In an embodiment, the knife gate may slice or saw through the organic material.

The knife of the knife gate may include a blade, a saw, or both.

In embodiments, various functions of the door or the knife gate may be controlled via the control system. For example, the door or the knife gate may open and close a predetermined number of times, staying in the open and closed positions a predetermined amount of time. The door or the knife gate may include at least one sensor, as described elsewhere herein, to detect the presence of the organic material, for example. The door or the knife gate may contribute to controlling the amount of the organic material being discharged from the storage module, for example.

The storage module 700 may include a leveling component, which may be a leveling conveyor such as another chain conveyor, disposed within the hollow enclosure to distribute the organic material (e.g. laterally) throughout the storage module. The leveling conveyor may include multiple openings (e.g. between cross-connecting bars of the chain conveyor), to allow organic material to fall through the leveling conveyor. The roof 703 may be rounded and provide clearance above the leveling component. The leveling component may be located in a top region of the storage module at a predetermined height above the removal component. The predetermined height may be fixed, may be manually or automatically adjustable (e.g. in response to the level of accumulated organic material inside the storage module), or both. The operation of the leveling component may be controlled (e.g. automatically) by the control system. For example, once the accumulated pile of the organic material at the upper opening end 710 reaches a certain height, as may be determined by one or more sensors, the control system may actuate the levelling component to begin operation. As the leveling component operates, it may carry a top portion of the accumulated pile laterally towards the discharge end or another location at which material is piled to a lesser height.

In an embodiment, the operation of the leveling component may be (automatically) synchronised to the operation of the second transfer module that feeds the organic material into the storage module. The operation of one or more conveyors of the second transfer module may cause the operation of the leveling component; the stoppage of the one or more conveyor of the second transfer module may cause the stoppage of the leveling component. In some embodiments, the levelling component includes stationary levelling bars in addition to or alternatively to a levelling conveyor. Stationary levelling bars may interoperate with the removal component to level organic material by having the removal component move piles of organic material into the levelling bars.

The leveling component and the internal component may be integrated into the storage module, may be adjustable, removable, or a combination thereof.

One or both of the removal component and the levelling component may be a continuous loop conveyor. One or both of the removal component and the levelling component may include a chain conveyor having at least two movable, continuous-loop chains and a plurality of cross-links. Each cross-link may be coupled to each of the continuous-loop chains. The cross-links may be configured to engage with and move components of the organic material.

The removal component and the levelling component may be powered by one or more electric motors 705 and 704, respectively. The one or more electric motors may be located externally to the hollow enclosure of the storage module.

As the levelling component operates to distribute the organic material within the storage module, the storage module may continue receiving the organic material until the level of the organic material within the storage module reaches a predetermined level or weight, or combination thereof, as may be measured by one or more sensors of the storage module. The storage module may accumulate and store the organic material for an amount of time. Once the storage module reaches capacity (capacity may be equivalent to a capacity of a container vehicle, for example), it may be considered full and the removal component may be operated to discharge the organic material into the discharge module, if a container vehicle is available to receive the organic material from the discharge module. The control system may request (e.g. automatically) the container vehicle to arrive to receive the accumulated organic material, which may contribute to improving the efficiency of removing the organic material from a site where the material handling system is operating by ensuring that every container vehicle receiving the organic material from the material handling system can be filled to capacity on arrival, contributing to limiting or minimizing any potentially or partially wasted trips, smaller material loads, and waiting (e.g. idling) to fill up to capacity by the container vehicles.

The one or more sensors may include detectors, radars, scales, for example, which may have some or all of the following functions: determining or monitoring one or all of the temperature, level, volume, weight and/or moisture content of the organic material in the storage container; determining or monitoring a gas amount, content and/or presence in the storage module. The one or more sensors may be in communication with the control system.

The storage module may be equipped with both load cells and sensors such as radar or optical sensors (e.g. cameras, LIDAR sensors, etc) for detecting the level of collected organic material. When a threshold amount (e.g. height, weight) of the organic material in the storage module is reached, the control system may, for example, send an alert to a remote monitoring station, which dispatches a vehicle (e.g. a container vehicle) to pick up the (accumulated) organic material. Load cells may be located within or inline with supports of the storage module. Other sensors such as radar or optical sensors may be located within the hollow enclosure at suitable points, for example near a top of the hollow enclosure.

The one or more sensors may include multiple load cells (e.g. piezoelectric load sensors) affixed, for example, at each corner of the storage module to determine the weight and distribution of the organic material currently in the module. The distribution of the organic material may be determined for example from relative weight measurements at each corner of the storage module. The one or more sensors may include radar, lidar, optical (e.g. machine vision) or similar sensors to determine the volume and/or distribution of the organic material inside the module. The measurements taken by the multiple load cells and the radar sensors and communicated to the control system, for example, may be used by the control system to estimate density and distribution of the organic material inside the storage module.

The one or more sensors may include some or all of the following: a piezoresistive sensor to measure weight of the organic material; ultrasonic sensors; 3D (three-dimensional) imaging sensors to measure the volume of the material, for example. In an embodiment, one or more scales may be used to weigh container vehicles discharging the organic material to the material handling system and/or receiving the organic material from the material handling system to measure the organic material weight added or removed from the material handling system. In an embodiment, one or more weight scales or other weighing systems may be used to determine the amount of added and/or discharged organic material to and from the system.

The one or more sensors of the storage module may communicate with the control system. Reaching a predetermined weight or volume value of the organic material accumulated in the storage module may trigger a response by the control system. The one or more sensors of the storage module may determine characteristics of a spatial distribution of the organic material in the hollow enclosure of the storage module. The response may include one or more commands sent by the control system to operate the removal and/or the levelling component via variable frequency drives (VFDs). The levelling component may be operating, for example, any time the organic material is being discharged into the storage module, and/or shortly thereafter. The removal component may be operating, for example, any time the organic material is to be discharged from the storage module. The removal system may operate at the same time as the discharge module to cooperate with the discharge module to move organic material. The one or more sensors of the storage module may measure one or both of total weight of the organic material within the hollow enclosure of the storage module and total volume of the organic material within the hollow enclosure.

The storage module 700 may include one or more access panels, for example a panel 708 in FIG. 7. Access panels may provide access to components of the storage module for inspection, adjustments and maintenance, for example. Some or all of the walls, top and panels of the storage module may form a shell, as described elsewhere herein. In an embodiment, the roof 703 may include an air circulator which many ventilate, filter, move air into or out of the storage module, reduce odour, reduce dust, or combinations thereof. Air inside the storage module may be filtered by a device installed on the storage module, adjacent the storage module, may be directed offsite, may be directed to a filtering device in a remote location, or a combination thereof. Contents of the air may be measured using sensors and the measurements provided to a controller, which may perform appropriate actions for example to mitigate greenhouse gas emissions or dangerous gas buildups.

In an embodiment, the storage module may include a chute at the bottom of the internal conveyor. The chute may contribute to containing and keeping off the ground the organic material and/or liquids expelled from thereof. A plurality of return pans may surround a head pulley and a tail pulley of the internal conveyor. Each return pan may overlap the nearest one or more pans to minimize possible escape points for both solid and liquid organic material components. The organic material that may be attached to a surface of the internal conveyor as it returns (rather than being transferred to the discharge module) may be contained in the chute until it is returned to the storage container. Any liquid expelled from the organic material may flow to a bottom of the chute.

In the present embodiment of the invention, the container is designed such that no liquid can readily escape. As well, the entire container is slightly elevated at the discharged end, encouraging liquid to accumulate at the bottom of the infeed end. Liquid from the organic material (i.e. liquid waste) that accumulates at the bottom of the container, and in the chute accommodating the conveyor, will eventually drain to a collection pan located below the tail pulley of the conveyor. This liquid from the organic material can be drained into an appropriate container or discharged directly to a safe location. As well, it may be valuable as a liquid fertilizer or similar "compost soup."

In embodiments, the storage module 700 may include a bottom containment system to inhibit the organic material from contacting the ground. The bottom containment system many include a capture surface located below the removal component of the storage module 700. The capture surface may catch the organic material that fails to be transferred to the discharge module 800 via the outlet 720 of the storage module 700. In an embodiment, the removal component may be configured to pull said organic material that fails to be transferred toward an end of the organic material storage module opposite the outlet and to reintroduce said organic material into the hollow enclosure of the storage module. For example, if the removal component is a continuous loop conveyor, then as the conveyor operates, its top-facing surface (e.g. facing the roof of the storage module) may move the organic material from the upper opening end 710 toward the opposite outlet 720 within the hollow enclosure of the storage module. After discharging the organic material via the outlet 720, the conveyor loops about a pulley (a head pulley) and moves in the opposite direction now facing the bottom of the storage module, during which the conveyor may carry some of the organic material that got stuck to the conveyor surface, for example. That is, the bottom-facing, returning portion of the continuous loop conveyor can pull with it at least some of the organic material that failed to transfer out of the storage module. This organic material is pulled to the beginning of the conveyor, where it can then be pulled back into the hollow enclosure. Spaces at the ends and underneath the conveyor can be provided to facilitate such a returning action.

In embodiments, the storage module may receive the organic material following the handling of the organic material by at least the transfer module. The material processing module may be absent in some embodiments of the material handling system.

In embodiments, the material handling system may include more than one storage module, arranged in series (e.g. the storage module discharging the organic material into a second storage module and so on), in parallel (e.g. a transfer module discharging the organic material into the storage module may pivot and begin discharging the organic material into a second transfer module), or in combination thereof. The second storage module may receive organic material via, for example, a conveyor receiving the organic material from one storage module and discharging it into the second storage module. The conveyor may be upwardly inclined and discharge the organic material into an upper opening of the second storage module.

Figure 7B:
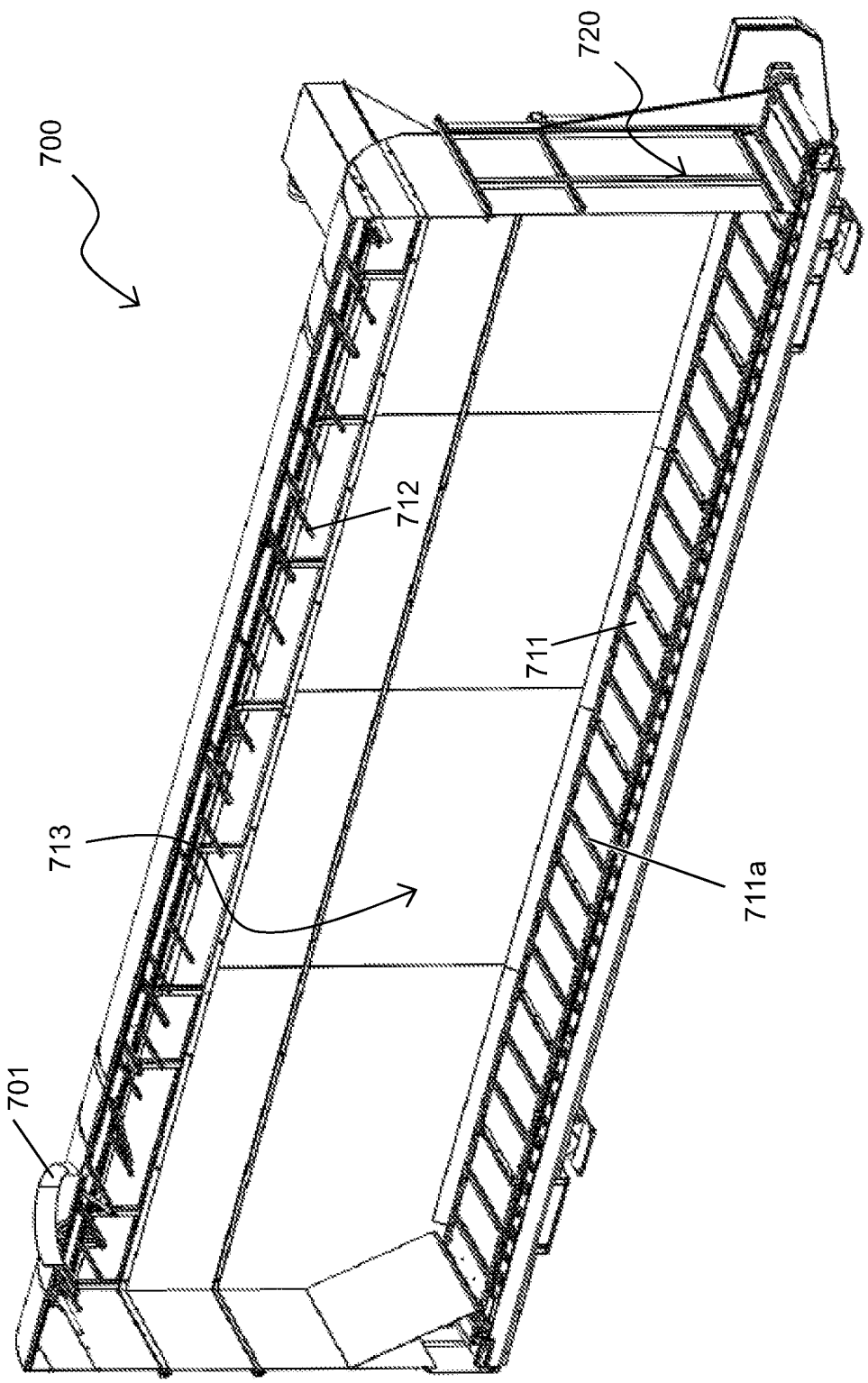
FIGS. 7B, 7C and 7D are cutaway schematic illustrations showing aspects of a storage module, according to embodiments of the present disclosure.

FIG. 7B is a cutaway schematic illustration of the storage module 700, showing the removal component 711 and the levelling component 712 inside a hollow enclosure 713, according to an embodiment. The removal component 711 is provided as two chain conveyors (only one is visible in FIG. 7B) each having a pair of continuous-loop chains connected by a plurality of cross-links (e.g. cross-link 711a). A floor is provided and located so that top portion of the chain conveyor (having cross-links moving in one direction) is located above the floor and the bottom portion of the chain conveyor (having cross-links moving in an opposite direction) is located below the floor. Organic material may be supported by the floor and pushed by the cross-links when the chains are moved via a motor, for example. This may allow the organic material to be discharged via an outlet 720 (shown with door closed) where it may be discharged onto a discharge conveyor.

The levelling component 712 is also provided as a chain conveyor having a pair of continuous-loop chains connected by a plurality of cross-links. Apertures exist between successive cross-links allowing the organic material to fall through. When the chains are moved via a motor, the cross-links may move accordingly to impact with and push the organic material that is stacked to at least the height of the levelling component. The organic material may be provided via inlet 701.

Figure 7C:
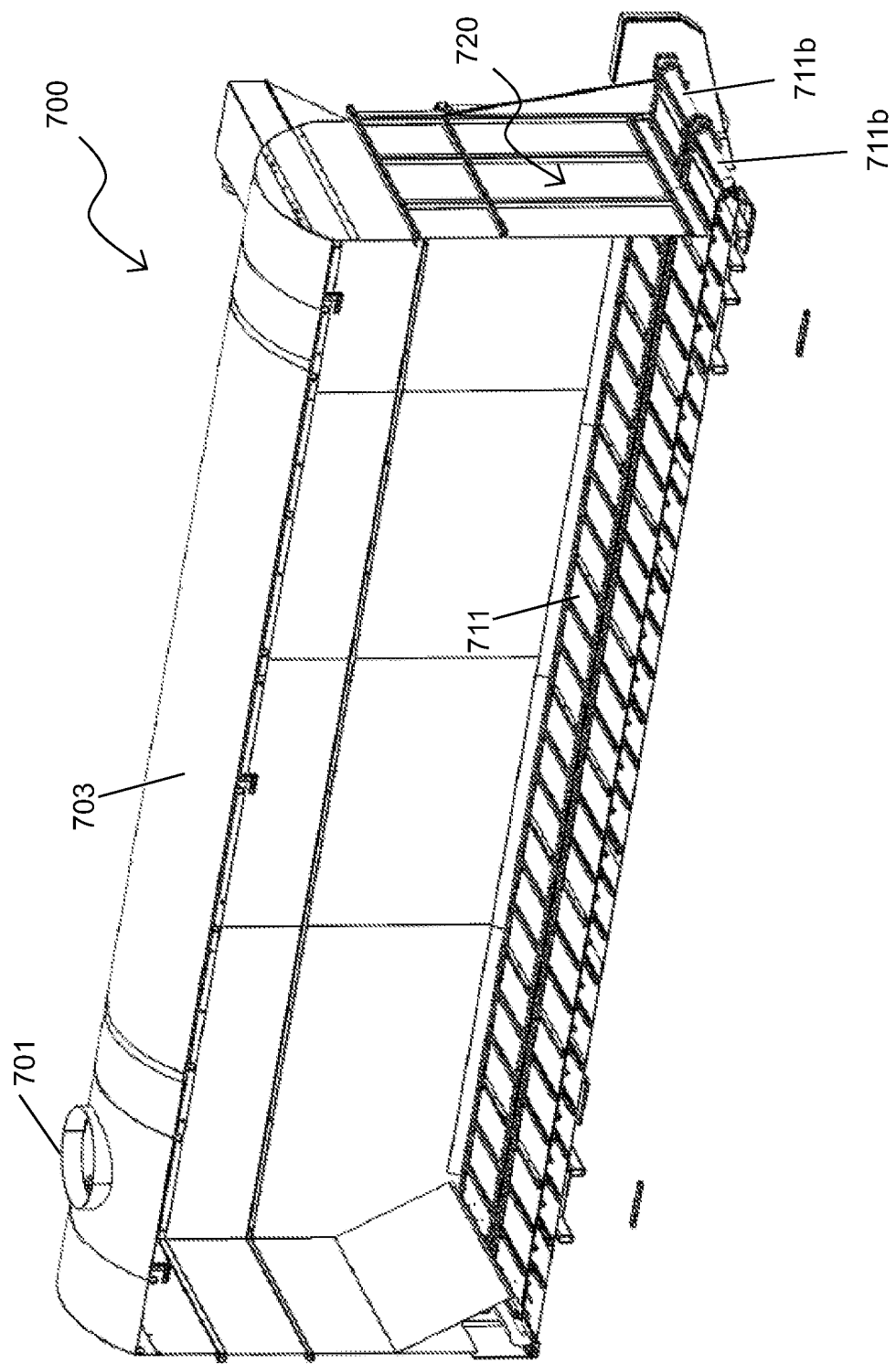

FIG. 7C is another cutaway schematic illustration of the storage module 700, similar to FIG. 7B. However further detail of the removal component 711 is shown in FIG. 7C. The removal component 711 of this illustrative embodiment includes two chain conveyors 711b.

Figure 7D:
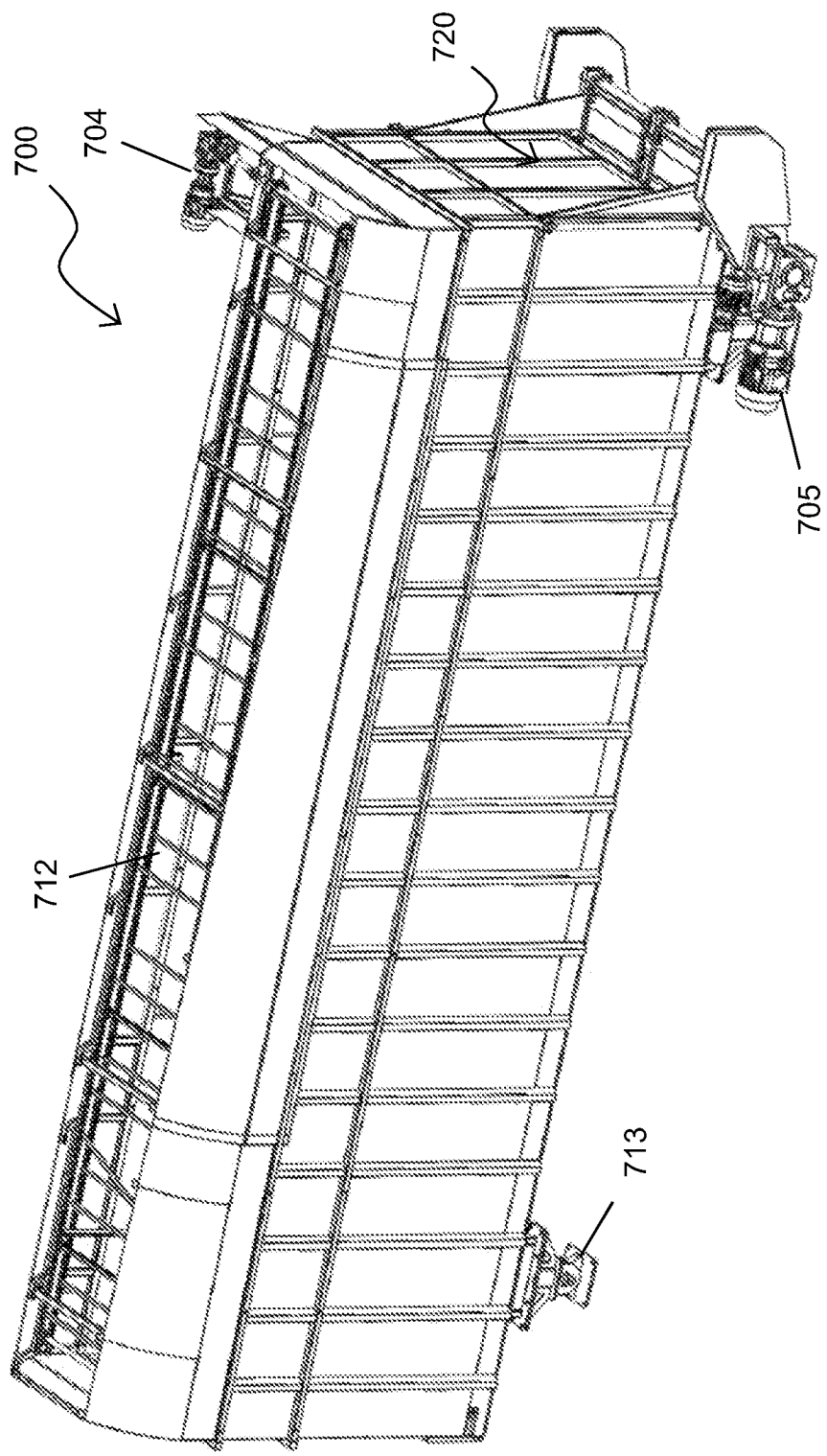

FIG. 7D is another cutaway schematic illustration of the storage module 700. In this illustration, the levelling component 712 is shown located in the upper region of the hollow enclosure of the storage module. A load cell 713 is shown and may be configured to estimate weight of the organic material stored in the storage module, possibly in coordination with other load cells which may be located in other areas of the storage module (not shown). A motor 704 which may operate one or more leveling conveyors or other devices in the storage module is also shown. A motor 705 which may operate one or more internal conveyors or other devices in the storage module is also shown. In embodiments, there may be included one or more motors 704 and 705.

Figure 7E:
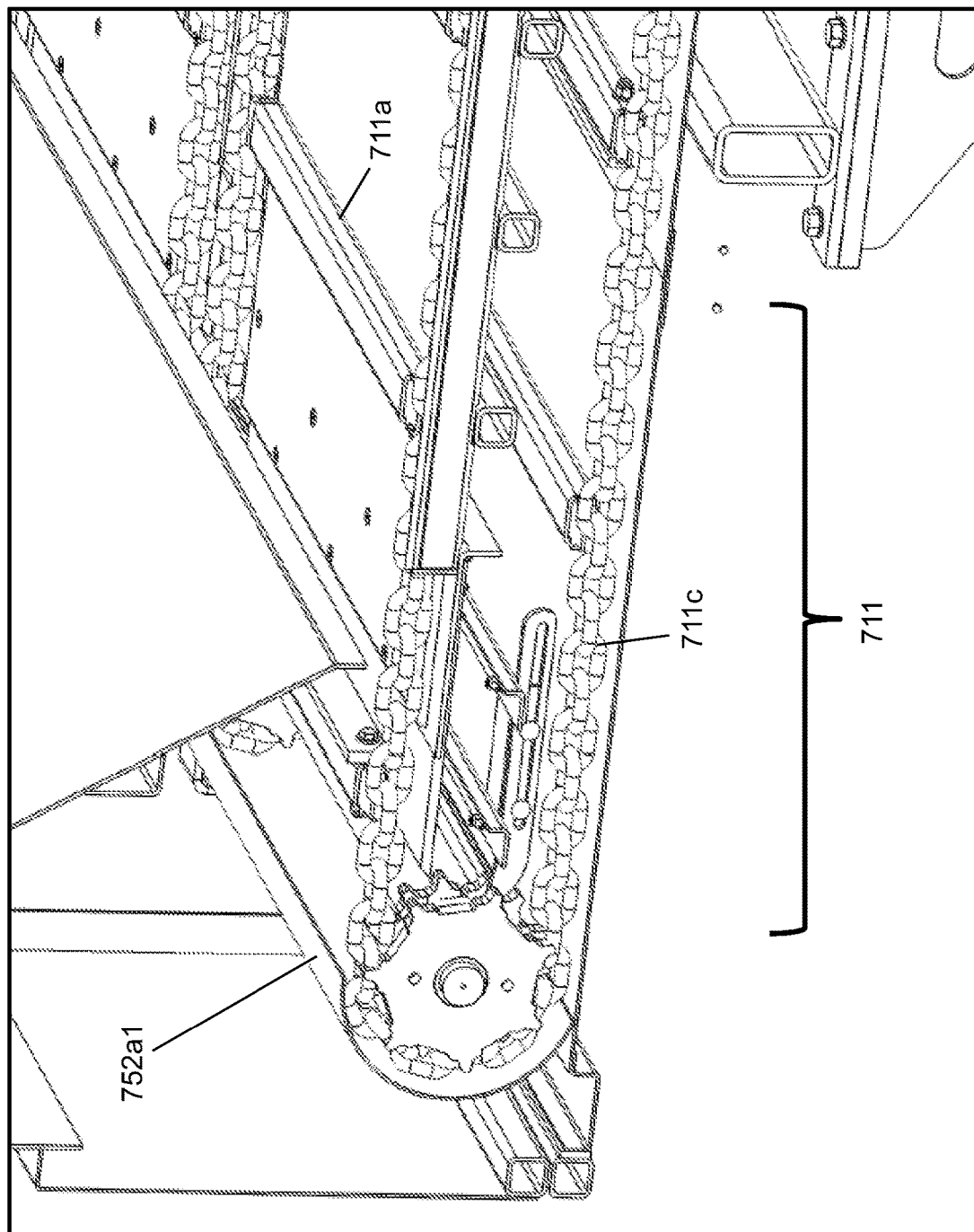
FIG. 7E is a schematic illustration of aspects of a return pan and removal component, according to embodiments of the present disclosure.
Figure 7F:
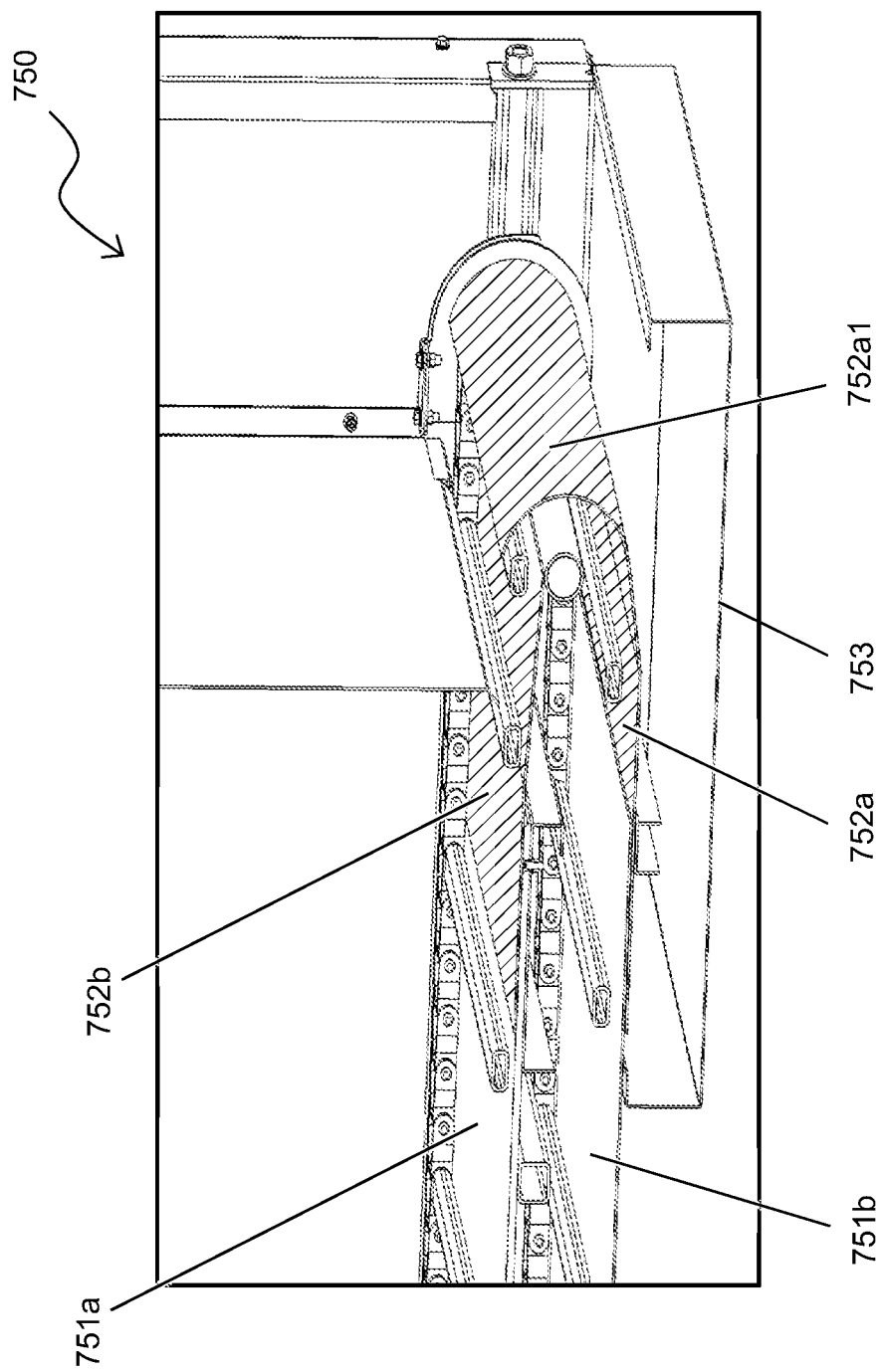
FIG. 7F is a schematic illustration of a return pan within a storage module, in accordance with an embodiment of the present disclosure.

FIG. 7E is a schematic illustration showing an end of the removal component 711, and is similar to FIG. 7F, discussed further herein. Aspects of a return pan (see component 750 in FIG. 7F) of the removal component are also shown, such as the curved section 752a1 which curves around the end of the removal component. The continuous-loop chains 711c and cross-links 711a of the chain conveyor (e.g. 711b in FIG. 7C) are shown.

FIG. 7F shows a schematic illustration of a return pan 750, according to an embodiment.

A return pan may be located at the end of the organic material storage module opposite the outlet. The return pan may include a first piece 752a having a first end which overlaps with and is located under the capture surface 75 lb. The first piece 752a further has a curved section 752a1 which curves around an end of the removal component to guide organic material upward back toward the hollow enclosure. The return pan may include a second piece 752b which overlaps overtop of a floor 751a of the hollow enclosure and extends toward the curved section to capture said organic material guided upward back toward the hollow enclosure. The first piece 752a and the second piece 752b may be movable with an end of the removal component which is located at said end of the organic material storage module opposite the outlet. The bottom containment system may include one or more liquid collection systems configured to receive liquid expelled from the organic material and direct said liquid toward a collection point. A collection pan 753 may form part of this liquid collection system. A lower floor 751b is provided to support organic material being pushed by the chain conveyor back toward the hollow enclosure.

In embodiments, at least one return pan as described above may be included with any one or more of the conveyors within any one or more module of the material handling system, as described herein. In an embodiment, each conveyor of the material handling system may include such a return pan.

A discharge module may be connected to an outlet of the storage module opposite an end at which the storage module receives organic material. The discharge module may be fed, for example, by a chain conveyor along the bottom of the storage module. Once a container vehicle is onsite for pickup of accumulated organic material, it may position under the discharge module outlet (e.g. having a discharge conveyor) and prepare to receive organic material.

Organic material may be discharged from the storage module by operating the internal conveyor of a removal component to transfer organic material to a (discharge) conveyor of a discharge module. The discharge conveyor may be similar in width and vertical angle to the transfer module conveyors and may receive the organic material from the storage module. The organic material may be transported by the discharge conveyor to an outlet end of the discharge conveyor where it can be discharged into a container, vehicle, or similar device capable of receiving the organic material from the material handling system.

Figure 8:
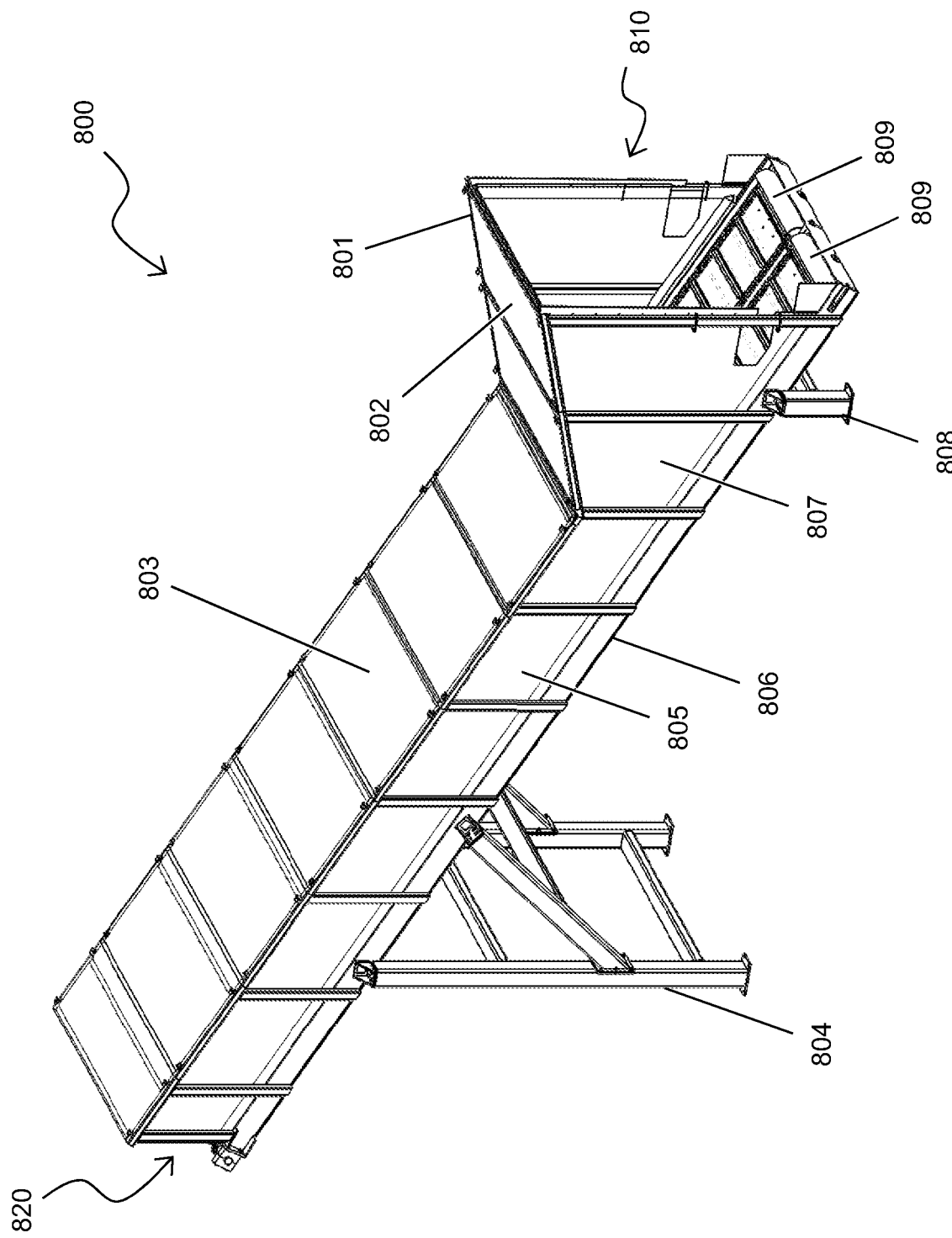
FIG. 8 is a schematic illustration of a discharge module, in accordance with an embodiment of the present disclosure.

FIG. 8 shows a schematic illustration of a discharge module 800, according to an embodiment.

The discharge module 800 may receive the organic material via an inlet 810 which is operatively coupled to the storage module 700. The operation of the discharge module 800 may be independent from at least the receiving module 300 and the transfer module 400. The dimensions of the inlet 810 may be matched to the dimensions of the outlet 720 of the storage module 700, for example, to mitigate the organic material from escaping the modules during transfer from the storage module to the discharge module.

The discharge module 800 may include one or more conveyors 809 for receiving and moving the organic material toward an outlet 820 that may deliver the organic material into a receiving (e.g. a second) container vehicle.

The discharge module 800 may include a frame 806 and supporting structures 804 and 808. The supporting structure 804 may support the frame 806 near the outlet 820. The supporting structure 808 may support the frame 806 near the inlet 810. The supporting structure 804 may be taller than the supporting structure 808 resulting in the frame 806 being positioned at an angle with outlet 820 being above the inlet 810. The discharge module 800 may be upwardly inclined. The height of the outlet 820 above ground may be predetermined in order accommodate a receiving container vehicle under the outlet 820 to receive the organic material. In an embodiment, the height of the outlet 820 may be adjustable, for example, by adjusting the height of the supporting structure 804. The outlet 820 may include additional structures, for example to support and guide the organic material being discharged through the outlet 820.

The frame 806 may have attached left and right side panels which may partially or fully enclose the left and right side of the one or more conveyors 809. The left and right side panels 807 near the inlet 810 may form a tapered section 801, forming a larger opening that forms the inlet 810, and decreasing in size into a smaller opening in the direction of movement of the organic material by the one or more conveyor 809. As the left and right side panels 808 decrease in size, they may be connected to the corresponding left and right side panels 804, some or all of which may have the same size. All adjacent panels may connect with one another either permanently or adjustably. The discharge module 800 may include top panels 802 covering the tapered section 801 and top panels 803 covering the one or more conveyors 809 along the side panels 804. All side and top panels may form a shell, as described elsewhere herein, that may enclose the organic material moving in the discharge module to an inner cavity formed by the one or more conveyor 809, the left and right side panels 805 and 807 and top panels 802 and 803. Other configurations of the discharge module and/or its enclosure can also be provided.

Embodiments of the present disclosure provide for a ramp, allowing container vehicles such as municipal collection trucks, to drive (e.g. back) onto it. The ramp may include guide rails on either side, to assist in guiding the vehicle tires into place. At the end of an upper portion of the ramp, wheel chocks may be used to prevent the vehicle from moving too far. There may also be a sensor to detect when the vehicle wheels are in place. The ramp (or another inclined or raised area) may be provided to allow container vehicles to gain elevation over the receiving module to allow for complete discharging of organic material.

Figure 9:
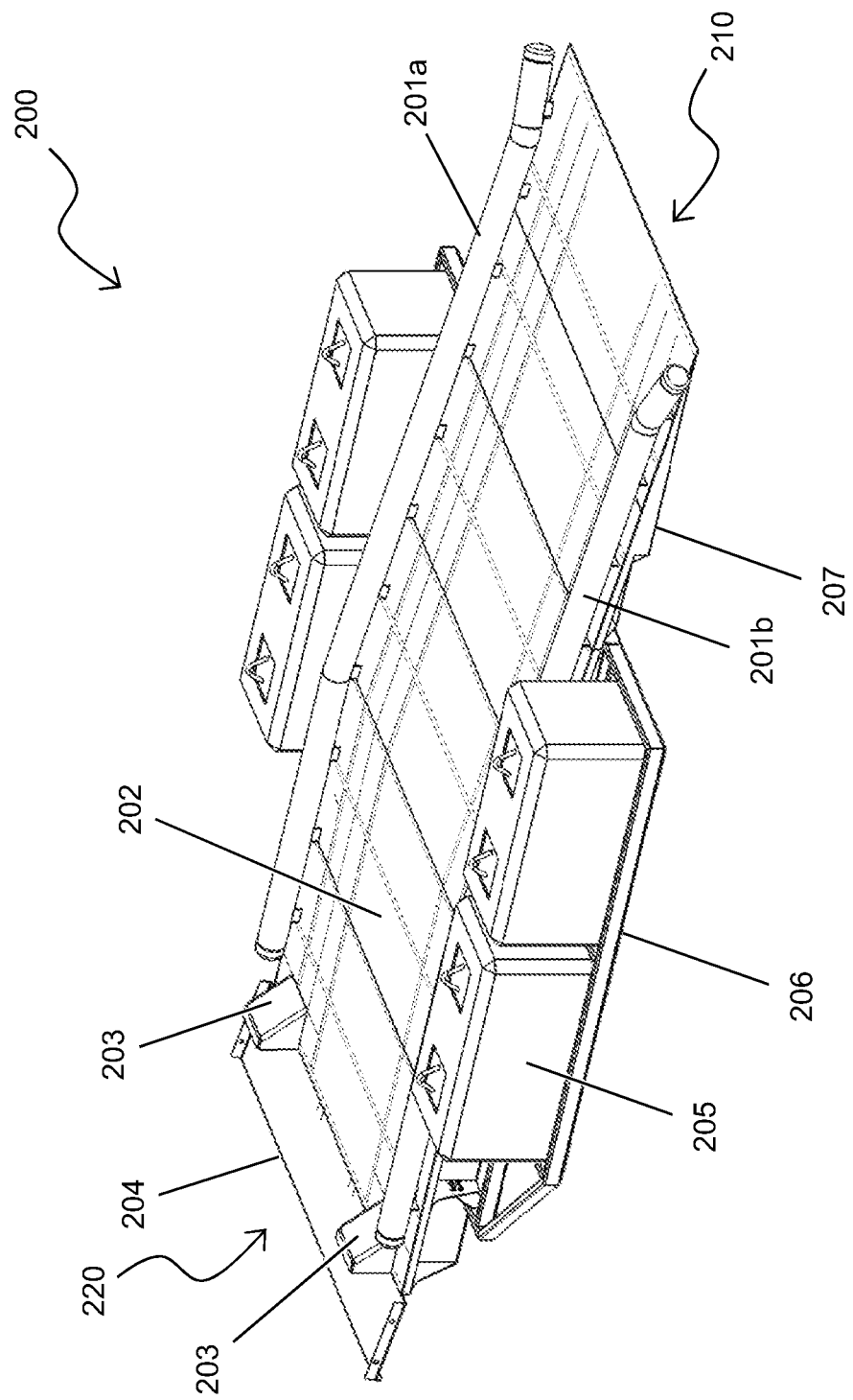
FIG. 9 is a schematic illustration of a ramp, in accordance with an embodiment of the present disclosure.

FIG. 9 shows a schematic illustration of a ramp 200, according to an embodiment.

The ramp 200 may have a lower end 210 that may be substantially level with the ground and allowing a container vehicle to drive onto the ramp directly from the ground. The ramp 200 may have an elevated end 220 opposite the lower end 210. The elevated end 220 may be substantially aligned with the inlet 310 of the receiving module 300. The elevated end 220 may be elevated for positioning the container vehicle relative to the inlet of the receiving module to a predetermined (e.g. optimized) height above ground that allows the container vehicle to discharge the organic material into the receiving module while the container vehicle is positioned at the elevated end 220 of the ramp 200.

The elevated end 220 may include a connecting part 204. The connecting part 204 may connect to the receiving module, for example, to secure the ramp to the receiving module. The elevated end 220 may include at least one wheel chock 203. In embodiments, at least two wheel chocks 203 may be positioned to block the at least two wheels of the container vehicle, for example to prevent the container vehicle from driving off the ramp or coming into contact with the receiving module and potentially damaging it. Wheel chock 203 may have a wedge shape, may be made of a sturdy material, and may have other design and compositional features that allow effective stoppage of a wheel of the container vehicle and prevent the container vehicle wheel from moving past the wheel chock, as understood by a person skilled in the art. A sensor may be integrated into the wheel chock of another part of the ramp to detect when a vehicle is in position.

The container vehicle may drive onto the lower end 210 of the ramp 200, while moving either forward or backward depending on the particular design of the material discharging mechanism of the container vehicle (e.g. a dump truck may back onto the ramp; a front end loader may drive forward onto the ramp).

The ramp 200 may be supported in elevated position and secured in place by a frame 206 containing heavy blocks 205. The frame 206 may extend horizontally outward on opposite side (i.e. left and right side) of the ramp 200 other than the lower end 210 and the elevated end 220. The frame on the left and right side may contain at least one heavy block 205, sufficient in total weight to ensure steady placement of the ramp during movement of the container vehicle on the ramp. It is noted that the blocks and other components may have hooks for use in moving the blocks by appropriate equipment, thus facilitating modularity of the system.

The ramp surface may include individual panels 202, which may overlap allowing for adjustable positioning of the ramp and to eliminate any gaps in the ramp surface.

The ramp 200 may include a left guard 201b and a right guard 201a. The guards may contribute to guiding the container vehicle movement on the ramp. The guards may include solid or semi-solid material, may be tubular, may have a shock absorbent quality, may be adjustable in position on the ramp, may be stationary, may be replaceable, and/or may be coated for increased visibility (e.g. bright colour, reflective in light, glow in the dark, etc.).

The ramp 200 may include one or more sensors (e.g. motion, weight, photosensor, light beam, a camera, etc.) having at least one of the following functions: determining when the container vehicle is in a predetermined position on the ramp; measuring weight of the container vehicle; and providing a live video feed of an area of the ramp, such as the wheel chocks, to allow an operator of the container vehicle to determine the position of the container vehicle on the ramp. The one or more sensors may provide the sensed information to the control system. By measuring weight of the container vehicle, the weight of the organic material entering the system can be determined. This information can be used by the control system to assist in tracking the amount of material in the system, which in turn can be used to schedule further loading and/or unloading operations.

In various embodiments, when a container vehicle arrives to receive accumulated organic material from the material handling system, an operator of the container vehicle may exit the vehicle and operate a touch screen interface on a loading user console, for example. The interface may allow the operator to select an amount of organic material to discharge by the material handling system (e.g. by the discharge module) at a time, which may be tracked via load cells in the storage module, for example. The organic material may also be discharged in multiple stages to accommodate different types of container vehicles. The interface may also allow or require the operator to enter an ID, password, and/or provide a magnetic swipe or RFID card to record the vehicle accepting the discharged organic material.

Figures 10A, 10B:
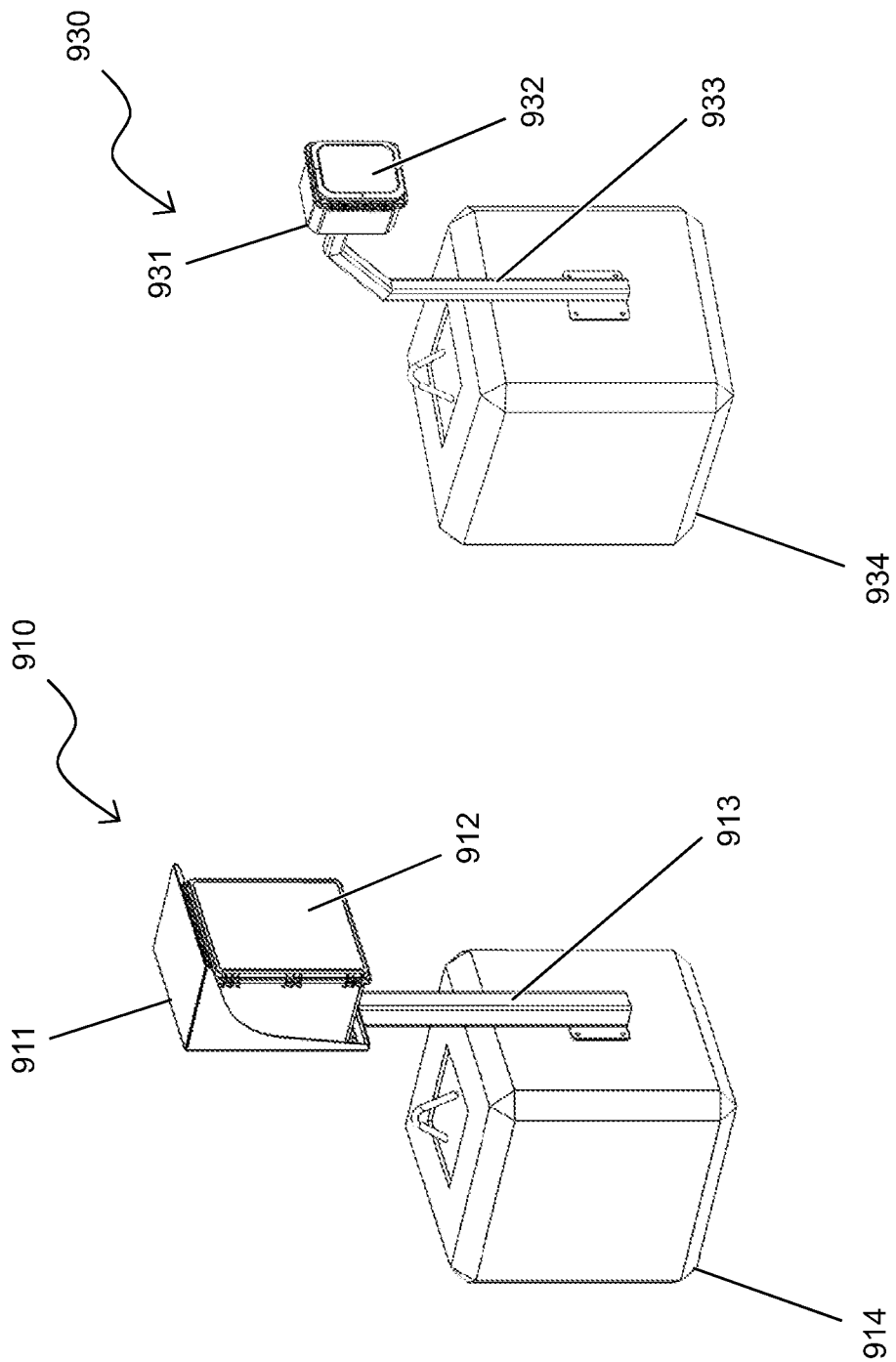
FIG. 10A is a schematic illustration of a loading user console, in accordance with an embodiment of the present disclosure.
FIG. 10B is a schematic illustration of an unloading user console, in accordance with an embodiment of the present disclosure.

FIG. 10A shows a schematic illustration of a loading user console 910, according to an embodiment.

The loading user console 910 may be standalone, or may be adjacent a module of the material handling system. The loading user console 910 may include a panel 912 that may include a cover 911. The cover 911 may provide some protection against weather (e.g. rain, snow, hail) and other elements (e.g. gravel, debris) to the panel 912. The panel 912 may include at least one of the following: a user input device, a user output device, one or more buttons, a key lock, a scanning device (e.g. barcode, access card), and an emergency stop button.

The loading user console 910 may include a base 914 that may support and stabilize the loading user console 910. The loading user console 910 may include a post 913, the lower end of the post 913 attached to the base 914 and the upper end of the post 913 attached to the panel 912, the cover 911, or both. The post 913 may have a fixed height or may be adjustable.

In various embodiments, once the container vehicle bringing the organic material to the material handling system is positioned on the ramp, the container vehicle operator may exit the container vehicle and enter an identification or access code into an unloading user console, enabling the material handling system for receiving material.

FIG. 10B shows a schematic illustration of an unloading user console 930, according to an embodiment.

The unloading user console 930 may be standalone, or may be adjacent a module of the material handling system. The unloading user console 930 may include a panel 932 that may include a cover 931. The cover 931 may provide some protection against weather (e.g. rain, snow, hail) and other elements (e.g. gravel, debris) to the panel 932. The panel 932 may include at least one of the following: a user input device, a user output device, one or more buttons, a key lock, a scanning device (e.g. barcode, access card), and an emergency stop button.

The unloading user console 930 may include a base 934 that may support and stabilize the unloading user console 930. The unloading user console 930 may include a post 933, the lower end of the post 933 attached to the base 934 and the upper end of the post 933 attached to the panel 932, the cover 931, or both. The post 933 may have a fixed height or may be adjustable.

In some embodiments, one or both of the loading and unloading user console can be replaced or augmented with remote devices such as cell phones, tablets, or computers, which are carried by personnel and which are communicatively coupled to the remainder of the control system via a wireless communication link.

Embodiments of present disclosure may include a signalling device (e.g. a signalling tower) with various indicators to assist (e.g. container) vehicles that are prepared for discharging the organic material. The signalling device may be positioned visible to approaching vehicles, as well as visible in a mirror of vehicles that are backing up or otherwise moving into a position to discharge the organic material.

The signalling device, in one such embodiment of the present disclosure, may have several lights to convey status and desired actions to the operators, especially those operating vehicles to discharge the organic material. The signalling device may be one aspect of a control system which monitors and controls the material handling system, as well as communicated with other systems, and interacts with users via multiple user interfaces.

The signalling device may have several lights to guide an operator inputting organic material into the material handling system]. The signalling device may be similar in appearance to a traffic light, with lights indicating various statuses of the material handling system.

Figure 11:
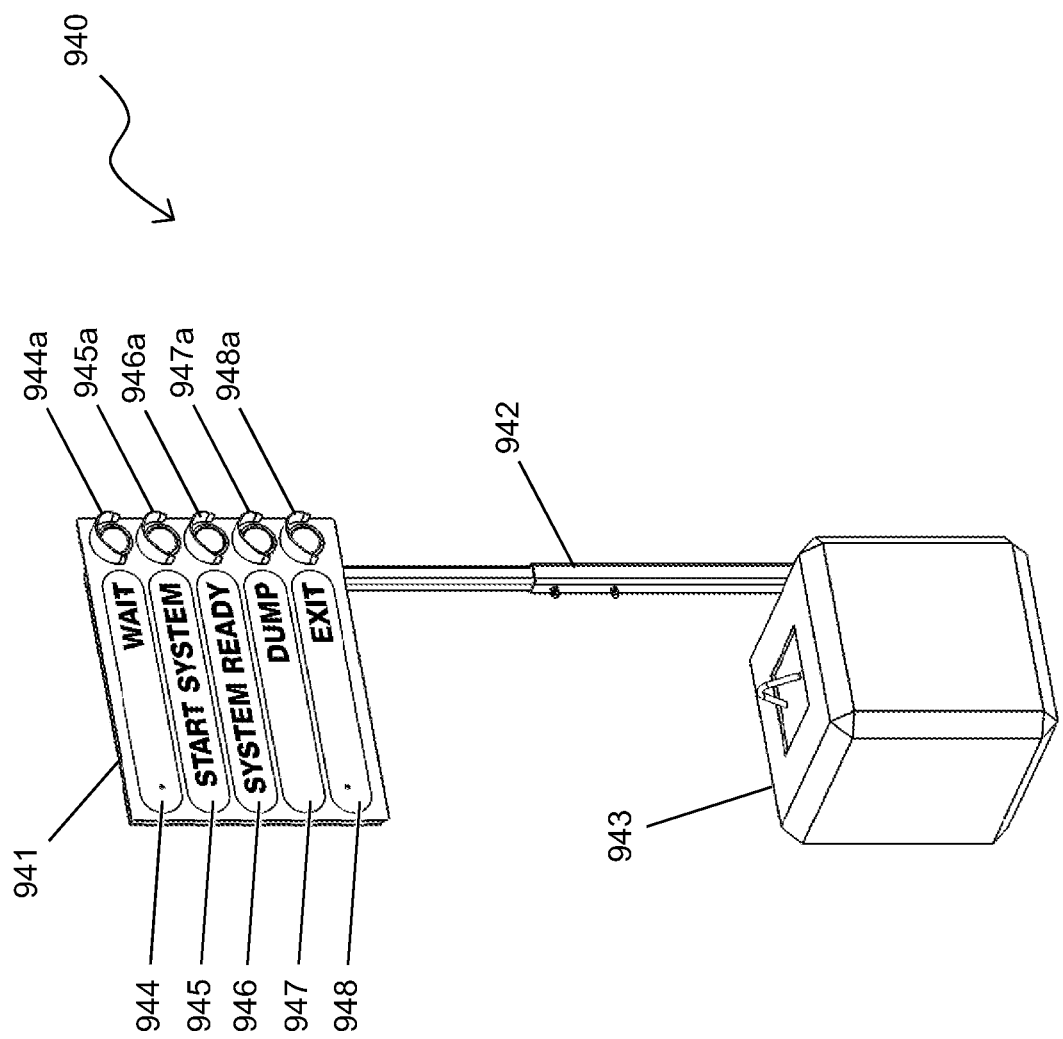
FIG. 11 is a schematic illustration of a signalling device, in accordance with an embodiment of the present disclosure.

FIG. 11 shows a schematic illustration of a signalling device 930, according to an embodiment. The signalling device is configured to communicate instructions to a vehicle driver, in relation to loading material into the system (or alternatively retrieving material from the system). Other types of signaling devices can be used, such as audio instructions, instructions conveyed by a remote device, etc. The signalling device can be controlled automatically by the control system or controlled by an operator.

The signaling device 940 may be standalone, or may be adjacent a module of the material handling system. The signaling device 940 may be positioned in a location most visible to an operator of a container vehicle delivering the organic material to or picking up organic material from the material handling system (e.g. visible when approaching the material handling system, visible when backing on site of the material handling system or on the ramp, visible in a mirror of the container vehicle when on site of the material handling system).

The signaling device 940 may include a plurality of indicators 941. At least one indicator in the plurality of indicators 941 may include at least one of the following attributes: be visible from a distance, be visible in different weather conditions, be visible at any time of day, have a corresponding message to be signalled.

In embodiments, plurality of indicators 941 may include the following indicators: "WAIT" indicator 944 with a corresponding light indicator 944a; "START SYSTEM" indicator 945 with a corresponding light indicator 945a; "SYSTEM READY" indicator 946 with a corresponding light indicator 946a; "DUMP" indicator 947 with a corresponding light indicator 947a; and "EXIT" indicator 948 with a corresponding light indicator 948a.

At least one indicator in the plurality of indicators 941 may include at least one of the following: a light (e.g. one colour, different colours corresponding to different signals, may be in constantly during signalling, may be on intermittently during signaling); a text (e.g. illuminating or not illuminating). At least one indicator in the plurality of indicators 941 may indicate one of the following: a message to an operator of the container vehicle to wait (e.g. "WAIT" indicator 944 with a corresponding light indicator 944a); a message to an operator of the container vehicle to perform a certain action (e.g. drive onto the ramp, enter input into the loading user console 910 or the unloading user console 930 as may be signalled by the "START SYSTEM" indicator 945 with a corresponding light indicator 945a, discharge the organic material into the receiving module as may be signalled by the "DUMP" indicator 947 with a corresponding light indicator 947a; exit the ramp as may be signalled by the "EXIT" indicator 948 with a corresponding light indicator 948a); an action being performed by a component of the material handling system; and a status of the material handling system or one of its modules (e.g. "SYSTEM READY" indicator 946 with a corresponding light indicator 946a).

The signaling device 940 may include a base 943 that may support and stabilize the signaling device 940. The signaling device 940 may include a post 942, the lower end of the post 942 attached to the base 943 and the upper end of the post 942 attached to the plurality of indicators 941. The post 942 may have a fixed height or may be adjustable.

In embodiments, the control system may be provided to, for example, control and monitor the handling of the organic material by the material handling system or by components thereof.

In embodiments, the entire material handling system or its individual modules may be monitored and controlled by the control system, which exists at least in part locally but may be operated locally or remotely. This control system may also interface with additional new or existing control systems.

A first operator panel, kiosk, control pad, touch screen, or similar interface (e.g. the unloading user console) may be provided to allow operators to input information and prepare the material handling system to receive organic material. Also potentially included is an RFID reader, magnetic card scanner, or other device for driver identification. The process of checking in the operator and preparing the material handling system for receiving organic material may also be done by a dedicated operator on site or remotely, or it may be automated by recognizing vehicles via RFID or other touchless system.

A main control cabinet which may house the control system components, any required transformers or other power systems, processor controls, and any other controls, electronic equipment, or power management equipment required to control and manage the system may be provided. These controls and components may also be distributed in several panels or junction boxes.

A second operator panel, kiosk, control pad, touch screen, or similar interface (e.g. the loading user console) may allow operators to input information and prepare the material handling system to discharge organic material. Also potentially included here is an RFID reader, magnetic card scanner, or other device for driver identification. The process of checking in the operator and preparing the material handling system to discharge organic material may also be done by a dedicated operator on site or remotely, or it may be automated by recognizing vehicles via RFID or other touchless system.

In embodiments, when a container vehicle is prepared to receive the organic material from the material handling system, the storage module may discharge (e.g. via the discharge module) the organic material for as long as it is commanded by the control system, which may be until a certain weight or volume of organic material is discharged.

The control system may control the operation of the material handling system where the material is handled by at least a receiving module, a transfer module, a storage module and a discharge module, as described herein. The control system may include a signaling device having one or more indicators. Each indicator may indicate an action to be taken by the container vehicle (e.g. to discharge the material, to exit the ramp, to wait, to prepare to receive the material, to enter an access code or and ID) or an action being performed by one or more modules handling the organic material (e.g. receiving material, discharging material).

The control system may receive readings from one or more sensors of the material handling system. Sensors may be configured, for example, to sense at least one of a weight of the organic material, a volume of the organic material, and a height of the organic material (e.g. on a conveyor or in a storage module). At least some of the sensors may be cooperatively configured to contribute to managing the operation of at least one module handling the organic material, for example via the control system. Sensors may detect accumulating amounts of organic material at multiple locations throughout the material handling system, for example the amount of organic material being discharged from the receiving module to the transfer module, the amount of organic material being received by the hopper of the material processing module, and the amount of organic material present in the storage module. The sensor readings, such as the amount of organic material at a specific location within the material handling system, may be used by the control system to control the operation of a conveyor within a module or a speed and/or operation of a conveyor of the material handling system.

The control system may control the amount of material discharged from the discharge module. For example, the discharge module may be set to deliver a first amount of the organic material from the outlet of the discharge module to the receiving container vehicle during a first period of time; and to deliver a second amount of the organic material from the outlet of the discharge module to the receiving container vehicle during a second period of time. The first period of time and the second period of time may be separated by another period of time during which there is not material discharged from the storage module. Further periods of time may also be provided for similarly. The beginning of each period of time may be specified by an operator. The receiving container vehicle may benefit from controlled discharge of the organic material from the storage module possibly allowing the operator of the receiving container vehicle to accurately load the vehicle while avoiding overfilling or under filling it. For example, an operator can initiate a first discharge into a first part of the vehicle during the first period of time, and then move the vehicle, and initiate a second discharge into a second part of the vehicle during the second period of time. The controlled discharge can include a controlled rate at which material is discharged from the storage module. When the material has been broken up into readily separable components, the discharge can be controlled more readily.

The control system may include a remote (e.g. radio) control subsystem to control one or more modules of the material handling system. The remote control subsystem may enable an operator of a container vehicle to enable the material handling system to receive the organic material at various points throughout the system. For example, an operator of an excavator may use the remote control subsystem to (e.g. remotely) enable the operation of the material processing module before discharging the organic material directly into a hopper of the material processing unit, or at another appropriate location. The remote control subsystem can include a radio interface on a predetermined radio band, a network interface such as a interface, a network interface operating over a cellular communication connection, or the like.

In some embodiments, the control system is configured to determine a control precedence between the loading user console, the unloading user console, one or more signaling devices, remote control subsystems or consoles that may or may not be within line of sight, and any other sources of control input. For example, when two commands are input to the system by two different users or from two different points, the control system may be configured to determine whether there is a conflict between the two commands, or whether the control system can operate the system to satisfy both commands concurrently. The conflict may be in the form of a safety issue or an operational issue. If a conflict exists, the control system may be configured to prioritize following some commands over others, based on a predetermined set of rules. In some embodiments, the rules may further be contingent on the output of one or more sensors.

In some embodiments, the control system is configured to slow and (possibly) eventually stop one or more operations, such as conveyor belt motions, to reduce or prevent additional accumulations of material. For example, the control system may determine via sensors that one or more portions of the material handling system are near capacity, in which case the control system may slow conveyors upstream of said portions so that an overload of material does not occur there. The control system may subsequently speed up these upstream conveyors when the sensors indicate that the material buildup to near capacity has abated. The control system may further signal a vehicle to retrieve material from the system in such an event, and/or signal other vehicles to abort providing new material into the system.

In some embodiments, the control system may be configured to maximize the rate or speed at which material is transported from the receiving module to the material storage module based on material accumulating at one or more critical points in the system. Sensors can be used to determine locations at which material may be accumulating, amounts of accumulations at such locations, or a combination thereof. This can be done by sensing rates of material flow at various points and performing subtractions to detect accumulations, or by sensing amounts of material at various points. The control system can be configured to set conveyor speeds such that material is inhibited from accumulating past a critical threshold at one, some or all locations within the system, but causing the rate at which material is transferred through one, some or all of these locations to be as high as possible while inhibiting such accumulation. A high rate of material transfer can be achieved by having a correspondingly high volume of material being transferred at a sufficient conveyor speed. Bottlenecks can be identified and the system can be slowed to inhibit problems such as jamming or overflow at these bottlenecks. Overflows and jams will tend to detract from the material transfer rate.

In some embodiments, the control system includes a communication interface, such as a network connection, allowing the system to communicate to a remote dispatch center or other operator when an alert condition is triggered. The alert condition can include that either the weight or volume (or both) of stored material meets or exceeds a configurable limit. The alert condition can include that an overflow, jam or equipment failure has occurred. The communication can include details of the circumstances triggering the alert condition.

In some embodiments, the control system includes input devices, such as RFID readers or optical or magnetic code readers, configured to read information directly from a vehicle, or from a card or similar device managed by the vehicle operator. The information can include an identification of an operator or vehicle for use in tracking purposes. In some embodiments, the information can include other information such as vehicle capacity, organic material composition, etc.

In some embodiments, the control system is configured to unload a predetermined or preselected amount (e.g. a majority) of material automatically via the discharge module. The control system may then be configured to present a manual control option, whereby an operator can manually input commands (e.g. button presses) to cause the system to unload further material under close manual supervision. For example, the control system can identify the capacity of the vehicle, transfer 80% or 90% (or a user-selected amount) of organic material to the vehicle automatically, and then stop, offering a manual control mode for loading a remaining amount, as desired.

In some embodiments, the control system is operator-configurable with respect to one or more settings. A user console such as a computer interface can be provided for configuring these settings according to operational needs or preferences. Examples of configurable settings include, conveyor speeds, alarm conditions, delays between certain conditions and associated actions, etc. An authorization may be required for changing settings, such as certain login credentials including a password, a certain key press sequence, biometrics, multi-factor authentication, credentials received from an RFID card, or the like, or a combination thereof.

Figure 12:
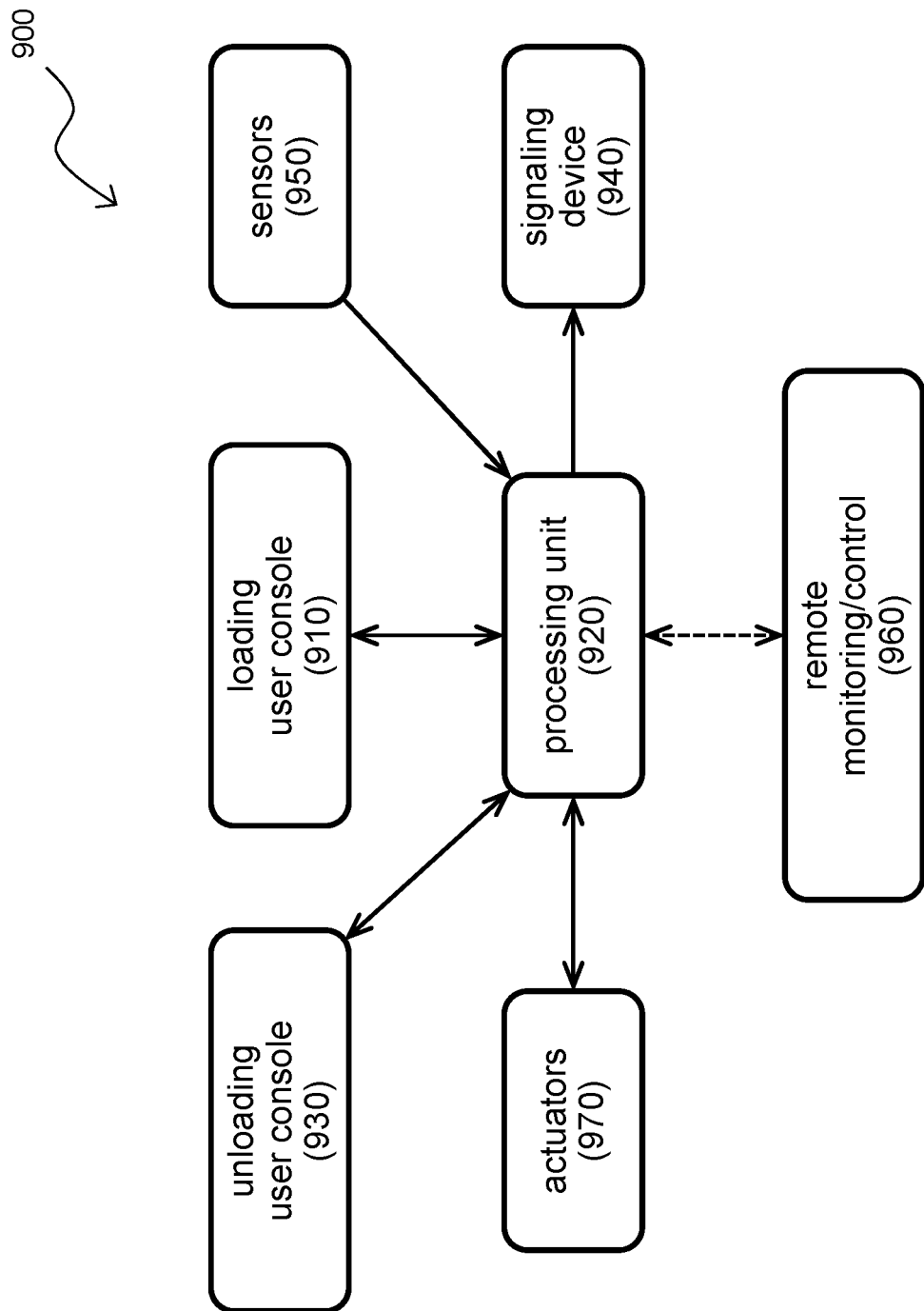
FIG. 12 is a schematic illustration of components of the control system, in accordance with an embodiment of the present disclosure.

FIG. 12 shows a schematic illustration of a control system 900, according to an embodiment.

The control system 900 includes a processing unit 920, which may include a plurality of processing sub-units. The processing unit 920 may exchange information and commands with the unloading user console 930 and the loading used console 910. The processing unit 920 may further receive information from a plurality of sensors 950. Sensors may be located in various modules and parts of the material handling system and function as described throughout the present disclosure. The signalling device 940 may also receive information from the processing unit 920.

The unloading user console of the control system may be configured to receive input related to unloading of the organic material by a container vehicle. The loading user console of the control system may be configured to receive input related to loading of the organic material into a second container vehicle. The processing unit of the control system may be configured to process input from at least one of the unloading user console, the loading user console, and a plurality of sensors (e.g. sensors 950) to detect a quantity (e.g. volume, weight, height or combination thereof) of the organic material in at least one location during the handling of the organic material.

In an embodiment, at least one of the unloading user console and the loading user console may include an operational data component. For example, the operational data component can provide, receive, or both provide and receive data indicative of different operational information, such as organic material volumes currently in the system or being provided to the system, composition of organic material, delivery or pickup schedule, delivery or pickup history, expected amount of time until storage module(s) are full or empty, etc.

The processing unit 920 may be in communication (e.g. wireless) with a remote station 960 which may have monitoring and/or control functions over the operation of the material handling system.

The control system 900 may include one or more actuators 970. The actuators 970 may include any motor or other movable device operating a module or a part of the material handling system, conveyor motors, gate motors, ventilation fans, and any other motorized moving parts of the material handling system. The actuators may receive commands from the processing unit 920 and in some embodiments may send information to the processing unit 920 which may include status of a respective actuator (e.g. non-operational, needing maintenance, connection to an actuator not detected).

In some embodiments, in relation to the control system, an estimate is maintained of the weight discharged from the storage module to the discharge module, but before the discharge module has discharged the material thereon into a waiting vehicle. This is useful to track because there may often be organic material left in the discharge module after the storage module stops providing material. This material can no longer be measured by weight sensors (e.g. load cells) of the storage module, but which will contribute to the total that is loaded into a trailer. This amount can be tracked by monitoring changes in the weight sensor readings, the discharge module conveyor speed, and the known length of the discharge module conveyor. In some embodiments, the control system use the information received from one or more sensors of the storage module related to the amount of the organic material discharged from the storage module. In addition, as the discharge module may not include any sensors to measure the amount of organic material on the discharge module, said amount may be estimated by the control system indirectly. For example, at least one of length, width, and (e.g. predetermined or measured in real time during operation) speed of one or more conveyor belts of the discharge module may be used by the control system to estimate (e.g. calculate) the amount of organic material remaining on the discharge module after it has discharged organic material to the capacity of the container vehicle receiving the organic material.

Although the material processing module is described primarily as being located at the interface between the transfer module and the second transfer module, in other embodiments the material processing module may be at another location, provided that effective material processing is still feasible. For example, the material processing module may be located between the receiving module and the transfer module. As another example, the material processing module may be located at the interface between a transfer module and the storage container. Multiple material processing modules, of the same type or different types, can be provided together or at separate locations.

Other embodiments may omit the material processing module and the second transfer module. Other embodiments may also include multiple material processing modules, additional conveyors, or multiple storage modules.

In embodiments, throughout the system, conveyors and material transfer points may be designed to capture and retain liquid from the organic material. As well, covers (e.g. tops, panels) on the conveyors and modules may reduce vector attraction, that is, the attraction of insects, rodents, and other undesired creatures. Smell and noise may also be reduced. In some embodiments, additional fans or filters may be used to further reduce escaping particulate and odour, especially on the storage module.

Embodiments of the present invention provide for multiple stages of organic material processing. Some or all of these stages may provide for a decompression of the organic material, which may be performed incrementally by each of a plurality of stages. Organic material is often delivered in compacted form for transportation purposes, for example by compressing the material into the container of a truck. This compacted form can be difficult to process, for example by a processing module such as a shredder. For example, objects such as twigs, branches, grasses and compost can be interwoven or tangled together and not readily separable. By processing the material at multiple successive stages, the material can be more readily processed overall. That is, the multiple stages cooperate together to process the material in a desired manner in multiple increments, rather than attempting to perform all of the processing at one point, such as at a single material processing module. Indeed, one example of such a stage is the material processing module itself.

Another example of such a stage is a levelling bar for example located at a receiving conveyor. Furthermore, two or more levelling bars may be provided as two or more respective stages. A first levelling bar may knock material off of the top of a pile. A second, lower levelling bar may spread the material out across a length and/or width of the conveyor. The first and second levelling bars may be disposed in a staggered or stacked configuration. The levelling bars may perform spreading, decompression, separation, or other desired actions on the organic material.

Another example of such a stage is at the interface between conveyors, where the organic material is made to fall a predetermined distance from one conveyor output end (outlet) onto another conveyor. This falling action allows the organic material to undergo further desired actions such as spreading, decompression and/or separation. For example, the organic material may fluff up and expand, or otherwise decrease in density. This action may be due in part to the falling itself, where a part of the material hangs in air for a certain period and is not pressed up against neighbouring material. This action may be due in part to the material landing on a conveyor surface at the end of falling, which imparts an impact force which may break apart the material. This action may further be due in part to the conveyor, upon which the material lands, running at speed. This may cause a spreading, rolling or otherwise agitating effect on the material as it lands due to a sudden change in horizontal as well as vertical direction of motion. Such stages can occur for example at the interface between the receiving module and the transfer module, at the interface between two transfer modules, at the interface between the material processing module and a conveyor providing material thereto or receiving material therefrom, or at the interface between the third transfer module and the storage module.

Potential advantages of embodiments of the present invention are listed as follows. The modular components may allow for a small site footprint in many layout configurations. No earthwork site preparation is necessarily required other than a compacted gravel foundation and a supply of power. The organic material may be rarely or never exposed to the ground and may be contained to reduce vector attraction and smell. The resulting site, being smaller and less intrusive than conventional sites, can be placed nearer to the collection locations, or multiple sites can be used. Sensors can be used to monitor the collected organic material and automatically dispatch trucks as required for hauling it away. A significant reduction in greenhouse gas emissions can potentially occurs for several reasons. Emission reduction can result from significantly less material handling as trucks dump straight into the system, and organic material is transloaded directly into trailers from the system. The number of idling trucks can be decreased, as trucks may be called only when needed for hauling away, and collection trucks may be guided by rails and the control system to quickly dump and leave the site. The material may be processed immediately, allowing moisture to be reduced, densifying the remaining solids, and reducing or removing handling and processing on the back end. The material can now be dumped directly into windrows on site. Another potential advantage is that noise may be reduced by the reduced handling and idling. Operating costs may be reduced by the decreased need for material handling and site monitoring. The resulting organic material may be dryer and denser, allowing for more efficient hauling. The transload/discharge method may involve a conveyor belt, allowing a wide variety of trailers and vehicles to be loaded.

Although embodiments of the present invention are described primarily with respect to handling of municipal organic material, it is noted that other applications and use cases for embodiments exist with comparable benefits. For example, embodiments of the present invention can be implemented for handling biowaste solids produced by sewage treatment plants.

The material handling system may include one or more liquid capture system configured to at least capture and retain liquid expelled by the organic material. A liquid capture system can be located generally below one or more modules of the material handling system and be configured to catch and redirect liquid that is released by or expelled from the organic material. The liquid capture system can include drainage elements at locations within modules which capture liquid from organic material being transported by such modules. The liquid capture system can include capture and drainage elements at locations around modules which capture liquid which overflows or spills from the modules. The drainage elements can include collection pans or funnels, coupled to a conduit such as a pipe or channel. The liquid capture system can be partially or fully configured to move liquid via the force of gravity toward a holding tank. Additionally or alternatively, one or more pumps can be used to move the liquid.

In embodiments, the liquid capture system may include one or more return pans, as described elsewhere herein. The liquid capture system may include one or more holding tanks for receiving the liquid expelled from the organic material. A holding tank may include a nozzle which may be used to prevent flow of liquid for some time and enable the flow of liquid when needed. The liquid may be drained into and/or from the storage tank as soon as it accumulates. The liquid capture system may include more than one storage tank connected in series, in parallel, or a combination thereof. Storage tank may be in communication with respective module of the material handling system from which it collects the liquid, or may be external to the material handling system, receiving the liquid via pipes or tubes, as will be readily understood by a person skilled in the art. The liquid may be, for example, routed or transported to a safe disposal location, used in fertilizing applications (e.g. compost tea). The liquid capture system may include one or more filters to screen the liquid to minimize clogging of various components of the liquid capture system. A filter may be easily removable for cleaning, replacement, or maintenance. The liquid capture system may include one or more pumps to pump the liquid between various components of the liquid capture system. The liquid capture system may include one or more sensors, for example to determine system blockage or to determine the amount of liquid in a holding tank. Sensors may be in communication with the control system. The control system may monitor and/or control the operation of the liquid capture system. The control system may dispatch a vehicle to empty the liquid holding tank when the liquid level reaches a predetermined amount, for example.

As will be understood in view of the above, embodiments of the present invention provide for a modular system of conveyors and at least one storage module to receive, accumulate, store, and discharge organic material. In various embodiments, the organic material is at no point in contact with the ground. The system may be designed to prevent the unintentional escape of liquid from the organic material. A modular component (processing module) for processing the organic material may also be included. The organic material may be allowed to expand and decompress prior to entering the storage module, for example using one, two or more passive processing operations. This passive processing may include the transfer of organic material from one conveyor to another via a drop and a change in horizontal direction that is greater than 20 degrees. In some embodiments, all modules requiring power are powered electrically. The receiving module's conveyor may be designed to accommodate the width of a trailer and may be at least 8 feet wide. The receiving module may include one, two or more levelling bars at least in part to limit the height of organic material prior to transferring to a next module. Multiple materials of various properties may be handled and stored together. In some embodiments, material can be input at multiple points in the system. Ventilation and/or air filtration may be provided on at least one of the modules to reduce escaping odours. A method utilizing conveyors and at least one storage module may be provided to receive, accumulate, store, and discharge organic material. The method may include actions as described elsewhere herein with respect to the various modules and their components.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A control system for controlled handling of an organic material, comprising:
    an unloading user console configured to receive input related to unloading of the organic material by a container vehicle;
    a loading user console configured to receive input related to loading of the organic material into a second container vehicle;
    a plurality of sensors configured to detect a quantity of the organic material in at least one location during the handling of the organic material; and
    a processing unit configured to process input from at least one of the unloading user console, the loading user console, and the plurality of sensors,
    wherein the organic material is handled by at least:
        a receiving module configured to receive organic material from a container vehicle and to move the organic material in a first direction toward an outlet of the receiving module, the organic material being discharged downward at the outlet of the receiving module;
        a transfer module configured to receive the organic material from the outlet of the receiving module, and to move the received organic material in a second direction toward an outlet of the transfer module;
        a storage module having an upper opening configured to receive and accumulate the organic material following handling by at least the transfer module; and
        a discharge module configured to receive the organic material from the storage module and to deliver the organic material from an outlet of the discharge module to a second container vehicle, the discharge module operable independently from at least the receiving module and the transfer module.

2. The control system of claim 1, further comprising:
    a signaling device in communication with the control system, the signaling device comprising:

a plurality of indicators, each indicator indicating an action to be taken by the container vehicle or an action being performed by at least one module handling the organic material.

3. The control system of claim 1, wherein the plurality of sensors are configured to sense at least one of: a weight of the organic material, a volume of the organic material, and a height of the organic material, and
wherein the processing unit is configured to operate at least one of the receiving module, the transfer module, the storage module and the discharge module based at least in part on output of at least one of the plurality of sensors.

4. The control system of claim 1, further comprising a remote radio control subsystem configured to control one or more of the receiving module, the transfer module, the storage module and the discharge module based on operator input received via the remote radio control subsystem.

5. The control system of claim 1, further configured to determine a control precedence of two or more input subsystems including the loading user console and the unloading user console, the control precedence indicative of which of the input subsystems the control system is responsive to when a conflict between commands received via the two or more input subsystems occurs.

6. The control system of claim 1, further configured to operate the discharge module to deliver a first controlled amount of the organic material from the outlet of the discharge module to the second container vehicle during a first period of time and deliver a second controlled amount of the organic material from the outlet of the discharge module to the second container vehicle during each of one or more second periods of time, the first period of time and each of the one or more second periods of time beginning at operator-specified time instances.

7. The control system of claim 1, wherein the container vehicle accesses the receiving module via a ramp to deliver the organic material.

8. The control system of claim 7, wherein at least one of the ramp and the receiving module comprise at least one sensor configured to determine a position of the container vehicle on the ramp or relative to the receiving module.

9. The control system of claim 1, further comprising a communication interface, the control system configured to automatically communicate, via the communication interface, with a remote dispatch center when either the weight or volume of stored organic material meets or exceeds a configurable limit.

10. The control system of claim 1, further comprising one or more input devices configured to automatically obtain information directly from a vehicle, or from a card or other device managed by an operator of the vehicle.

11. The control system of claim 1, further configured to unload a preselected amount of the organic material automatically to the second container vehicle, the preselected amount being less than a capacity of the second container vehicle, and subsequently present a manual control mode responsive to manual operator control to unload an additional amount of the organic material the second container vehicle.

12. The control system of claim 1, further comprising a plurality of operator-configurable settings, accessible via at least one user console, the operator-configurable settings comprising one or more of: one or more conveyor speeds; and one or more delays between specified conditions and specified actions.

13. The control system of claim 12, where the operator-configurable settings are adjustable upon proper authorization credentials being received.

14. A control system for controlled handling of an organic material comprising:
an unloading user console configured to receive input related to unloading of the organic material by a container vehicle;
a loading user console configured to receive input related to loading of the organic material into a second container vehicle;
a plurality of sensors configured to detect a quantity of the organic material in at least one location during the handling of the organic material; and
a processing unit configured to process input from at least one of the unloading user console, the loading user console, and the plurality of sensors,
wherein the plurality of sensors comprises sensors configured to detect one or more accumulating volumes of the organic material at one or more locations within a system handling the organic material, the system being controlled by the control system,
wherein the control system is configured to maximize a rate at which the organic material is transported from an organic material input to an organic material storage module, said rate being maximized based on an indication of material accumulating at one or more critical points in between the organic material input and the organic material storage module.

15. The control system of claim 14, wherein the control system is configured to adjust speed of one or more conveyors of the system handling the organic material based at least in part on output of the sensors configured to detect one or more accumulating volumes.

16. The control system of claim 14, wherein the plurality of sensors are configured to sense at least one of: a weight of the organic material, a volume of the organic material, and a height of the organic material, and
wherein the processing unit is configured to operate at least one of the receiving module, the transfer module, the storage module and the discharge module based at least in part on output of at least one of the plurality of sensors.

17. The control system of claim 14, wherein the container vehicle accesses the receiving module via a ramp to deliver the organic material.

18. The control system of claim 14, further configured to unload a preselected amount of the organic material automatically to the second container vehicle, the preselected amount being less than a capacity of the second container vehicle, and subsequently present a manual control mode responsive to manual operator control to unload an additional amount of the organic material the second container vehicle.

19. A method comprising, by an automatic control system:
receiving, by an unloading user console, input related to unloading of organic material by a container vehicle;
receiving, by a loading user console, input related to loading of the organic material into a second container vehicle;
detecting, by a plurality of sensors, a quantity of the organic material in at least one location during handling of the organic material; and
processing, by a computer processing unit, input from at least one of the unloading user console, the loading user console, and the plurality of sensors, wherein the organic material is handled by at least:
- a receiving module configured to receive organic material from a container vehicle and to move the organic material in a first direction toward an outlet of the receiving module, the organic material being discharged downward at the outlet of the receiving module;
- a transfer module configured to receive the organic material from the outlet of the receiving module, and to move the received organic material in a second direction toward an outlet of the transfer module;
- a storage module having an upper opening configured to receive and accumulate the organic material following handling by at least the transfer module; and
- a discharge module configured to receive the organic material from the storage module and to deliver the organic material from an outlet of the discharge module to a second container vehicle, the discharge module operable independently from at least the receiving module and the transfer module.

* * * * *